United States Patent
Zhu

(10) Patent No.: US 12,501,617 B2
(45) Date of Patent: Dec. 16, 2025

(54) NOR-TYPE MEMORY DEVICE, METHOD OF MANUFACTURING NOR-TYPE MEMORY DEVICE, AND ELECTRONIC APPARATUS INCLUDING MEMORY DEVICE

(71) Applicant: INSTITUTE OF MICROELECTRONICS, CHINESE ACADEMY OF SCIENCES, Beijing (CN)

(72) Inventor: Huilong Zhu, Poughkeepsie, NY (US)

(73) Assignee: INSTITUTE OF MICROELECTRONICS, CHINESE ACADEMY OF SCIENCES, Beijing (CN)

( * ) Notice: Subject to any disclaimer, the term of this patent is extended or adjusted under 35 U.S.C. 154(b) by 554 days.

(21) Appl. No.: 18/042,906

(22) PCT Filed: Jul. 5, 2022

(86) PCT No.: PCT/CN2022/103807
§ 371 (c)(1),
(2) Date: Feb. 24, 2023

(87) PCT Pub. No.: WO2023/011084
PCT Pub. Date: Feb. 9, 2023

(65) Prior Publication Data
US 2023/0301100 A1    Sep. 21, 2023

(30) Foreign Application Priority Data

Aug. 2, 2021   (CN) .......................... 202110883350.7

(51) Int. Cl.
*H10B 51/20* (2023.01)
*G11C 16/04* (2006.01)
(Continued)

(52) U.S. Cl.
CPC ......... *H10B 43/27* (2023.02); *G11C 16/0483* (2013.01); *H01L 23/5226* (2013.01);
(Continued)

(58) Field of Classification Search
CPC ........ H10B 43/27; H10B 43/10; H10B 51/10; H10B 51/20; H10B 43/50; H10B 43/35;
(Continued)

(56) References Cited

U.S. PATENT DOCUMENTS

| 11,309,422 B2 | 4/2022 | Zhou |
| 2011/0024818 A1 | 2/2011 | Ahn |

(Continued)

FOREIGN PATENT DOCUMENTS

| CN | 106298792 A | 1/2017 |
| CN | 112309860 A | 2/2021 |

(Continued)

OTHER PUBLICATIONS

Chinese Office Action dated Jan. 28, 2023, for corresponding Chinese Application No. 202110883350.7.
(Continued)

*Primary Examiner* — William B Partridge
*Assistant Examiner* — Erik A. Anderson
(74) *Attorney, Agent, or Firm* — Kinney & Lange, P.A.

(57) ABSTRACT

Disclosed are a NOR-type memory device, a method of manufacturing the NOR-type memory device, and an electronic apparatus. The NOR-type memory device includes: a memory device layer, including a first source/drain region, a second source/drain region and a first channel region; a first gate stack extending vertically to pass through the memory device layer and including a first gate conductor layer and a memory functional layer, and a memory cell is defined at an intersection of the first gate stack and the memory device layer; a selection device layer on the
(Continued)

memory device layer, including a third source/drain region, a fourth source/drain region and a second channel region; a second gate stack above the first gate stack and extending vertically to pass through the selection device layer; and a connecting portion electrically connecting the third source/drain region to the first gate conductor layer.

19 Claims, 17 Drawing Sheets

(51) Int. Cl.
 H01L 23/522 (2006.01)
 H01L 23/528 (2006.01)
 H10B 43/10 (2023.01)
 H10B 43/27 (2023.01)
 H10B 51/10 (2023.01)
(52) U.S. Cl.
 CPC ......... *H01L 23/5283* (2013.01); *H10B 43/10* (2023.02); *H10B 51/10* (2023.02); *H10B 51/20* (2023.02)
(58) Field of Classification Search
 CPC ........ H10B 43/40; H10B 51/30; H10B 51/40; H10B 51/50; G11C 16/0483; G11C 16/08; G11C 16/0416; G11C 11/223; H01L 23/5226; H01L 23/5283
 See application file for complete search history.

(56) References Cited

U.S. PATENT DOCUMENTS

| | | | |
|---|---|---|---|
| 2011/0140070 A1* | 6/2011 | Kim | ................... G11C 11/5678 257/E27.002 |
| 2013/0153847 A1 | 6/2013 | Park et al. | |
| 2015/0069377 A1* | 3/2015 | Rabkin | .................. H10B 41/41 257/43 |
| 2022/0123003 A1* | 4/2022 | Young | ................... H10B 43/50 |
| 2022/0285506 A1 | 9/2022 | Zhu | |

FOREIGN PATENT DOCUMENTS

| | | |
|---|---|---|
| CN | 112909010 A | 6/2021 |
| CN | 112909011 A | 6/2021 |
| CN | 112909012 A | 6/2021 |
| CN | 113707666 A | 11/2021 |
| CN | 113707667 A | 11/2021 |

OTHER PUBLICATIONS

International Search Report and Written Opinion dated Sep. 15, 2022, for corresponding PCT Application No. PCT/CN2022/103807.

* cited by examiner

NOR-TYPE MEMORY DEVICE, METHOD OF MANUFACTURING NOR-TYPE MEMORY DEVICE, AND ELECTRONIC APPARATUS INCLUDING MEMORY DEVICE

CROSS REFERENCE TO RELATED APPLICATION(S)

This application is a National Stage Application of International Application No. PCT/CN2022/103807, filed on Jul. 5, 2022, entitled "NOR-type memory device, method of manufacturing NOR-type memory device, and electronic apparatus including memory device", which claims priority to Chinese Patent Application No. 202110883350.7, filed on Aug. 2, 2021, the entire contents of which are incorporated herein in their entireties by reference.

TECHNICAL FIELD

The present disclosure relates to a field of semiconductors, in particular to a NOR-type memory device, a method of manufacturing the NOR-type memory device, and an electronic apparatus including the memory device.

BACKGROUND

In a planar device such as a Metal Oxide Semiconductor Field Effect Transistor (MOSFET), a source, a gate and a drain are arranged in a direction substantially parallel to a substrate surface. Due to such an arrangement, the planar device is difficult to be further scaled down. In contrast, in a vertical device, a source, a gate and a drain are arranged in a direction substantially perpendicular to a substrate surface. As a result, the vertical device is easier to be scaled down compared to the planar device.

Vertical devices may be stacked to increase the integration density. However, this may lead to poor performance. Because in order to stack a plurality of devices conveniently, polycrystalline silicon is usually used as a channel material, resulting in a greater resistance compared with using monocrystalline silicon as the channel material. In addition, it is also desirable to control word lines by using a selection switch device, so as to save interconnection lines.

SUMMARY

In view of this, an objective of the present disclosure is at least partially to provide a NOR-type memory device with an improved performance, a method of manufacturing the NOR-type memory device, and an electronic apparatus including the memory device.

According to an aspect of the present disclosure, a NOR-type memory device is provided, including: a memory device layer on a substrate, wherein the memory device layer includes a first source/drain region and a second source/drain region located at opposite ends of the memory device layer in a vertical direction and a first channel region located between the first source/drain region and the second source/drain region in the vertical direction; a first gate stack that extends vertically with respect to the substrate to pass through the memory device layer, wherein the first gate stack includes a first gate conductor layer and a memory functional layer disposed between the first gate conductor layer and the memory device layer, and a memory cell is defined at an intersection of the first gate stack and the memory device layer; a selection device layer on the memory device layer, wherein the selection device layer includes a third source/drain region and a fourth source/drain region located at opposite ends of the selection device layer in the vertical direction and a second channel region located between the third source/drain region and the fourth source/drain region in the vertical direction; a second gate stack disposed above the first gate stack, wherein the second gate stack extends vertically with respect to the substrate to pass through the selection device layer; and a connecting portion electrically connecting the third source/drain region to the first gate conductor layer.

According to another aspect of the present disclosure, a method of manufacturing a NOR-type memory device is provided, including: stacking at least one memory device layer on a substrate, wherein each memory device layer includes a first source/drain region and a second source/drain region located at opposite ends of each memory device layer in a vertical direction and a first channel region located between the first source/drain region and the second source/drain region in the vertical direction; forming a selection device layer on an uppermost memory device layer, wherein the selection device layer includes a third source/drain region and a fourth source/drain region located at opposite ends of the selection device layer in the vertical direction and a second channel region located between the third source/drain region and the fourth source/drain region in the vertical direction; forming a plurality of processing channels that extend vertically with respect to the substrate to pass through the selection device layer and each memory device layer, wherein in a plan view, the plurality of processing channels are arranged in an array including rows in a first direction and columns in a second direction intersecting the first direction; forming a first gate stack in the processing channel, wherein the first gate stack includes a first gate conductor layer and a memory functional layer disposed between the first gate conductor layer and the memory device layer, and a memory cell is defined at an intersection of the first gate stack and the memory device layer; separating the selection device layer into portions respectively surrounding peripheries of corresponding processing channels in which the first gate stacks are formed; forming a plurality of word lines extending in the first direction and arranged in the second direction, wherein each word line surrounds a portion of the selection device layer on a periphery of a corresponding row of processing channels and is in contact with the fourth source/drain region of the portion; recessing the first gate stack to release an upper space of the processing channel, so that the third source/drain region of the selection device layer is at least partially exposed in the upper space; forming a connecting portion on the first gate stack in the processing channel, so as to electrically connect the third source/drain region of the selection device layer to the first gate conductor layer; forming a second gate stack on the connecting portion in the processing channel; and forming a plurality of selection lines extending in the second direction and arranged in the first direction, wherein the plurality of selection lines are electrically connected to the second gate stacks formed in corresponding columns of processing channels respectively.

According to another aspect of the present disclosure, an electronic apparatus is provided, including the NOR-type memory device described above.

According to the embodiments of the present disclosure, due to an introduction of the selection transistor, it is possible to reduce wires to save an area. A three-dimensional (3D) NOR-type memory device may be constructed by using a stack of monocrystalline material as a constructing block. Therefore, when a plurality of memory cells are stacked, an increase in resistance may be suppressed. In addition, source/drain doping may be performed through diffusion by using a solid phase dopant source layer, which helps to form steep high source/drain doping.

BRIEF DESCRIPTION OF THE DRAWINGS

The above and other objectives, features and advantages of the present disclosure will be more apparent through the following description of the embodiments of the present disclosure with reference to the accompanying drawings, in which:

FIG. 1 to FIG. 19(c) show schematic diagrams of some stages in a process of manufacturing a NOR-type memory device according to the embodiments of the present disclosure; and FIG. 20 schematically shows an equivalent circuit diagram of a NOR-type memory device according to the embodiments of the present disclosure, in which:

FIG. 2(a) shows positions of line AA' and line BB', FIGS. 1, 2(b), 3 to 6, 7(b), 8(b), 9 to 12, 13(b), 14(a), 15(a), 16(a), 17(a), 18(b) and 19(b) are cross-sectional views taken along line AA', and FIGS. 14(b), 15(b), 16(b), 17(b), 18(c) and 19(c) are cross-sectional views taken along line BB'.

Throughout the accompanying drawings, the same or similar reference numbers denote the same or similar elements.

DETAILED DESCRIPTION OF EMBODIMENTS

Figure 1:
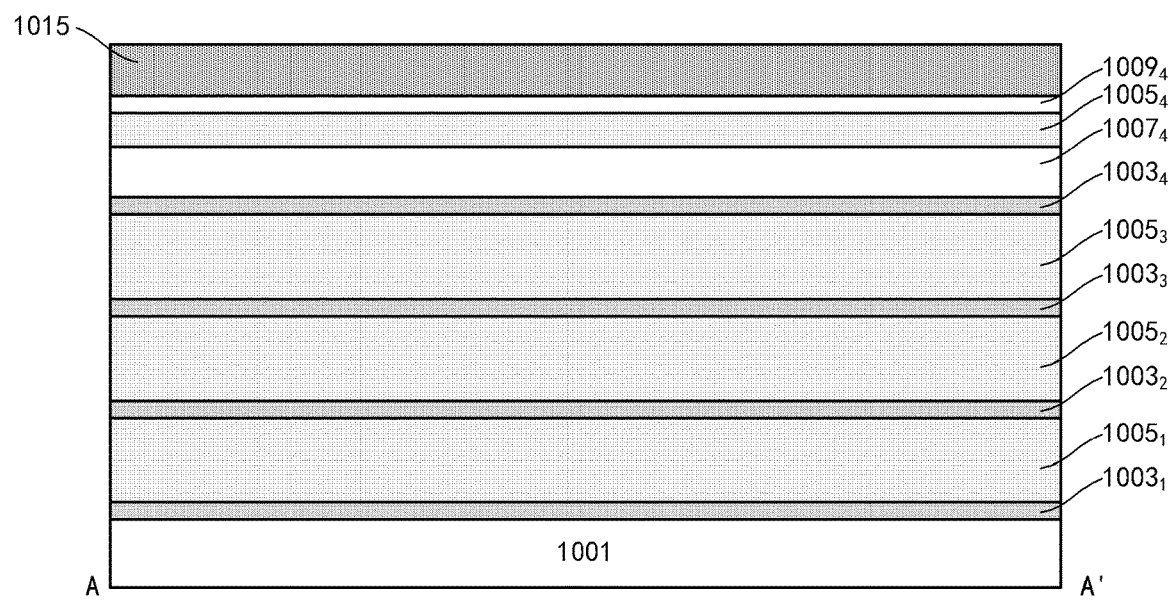

Embodiments of the present disclosure will be described below with reference to the accompanying drawings. It should be understood, however, that these descriptions are merely exemplary and are not intended to limit the scope of the present disclosure. In addition, in the following, descriptions of well-known structures and technologies are omitted to avoid unnecessarily obscuring the concepts of the present disclosure.

Various schematic structural diagrams according to the embodiments of the present disclosure are shown in the accompanying drawings. The figures are not drawn to scale. Some details are enlarged and some details may be omitted for clarity of presentation. The shapes of the various regions and layers as well as the relative size and positional relationship thereof shown in the figures are merely exemplary. In practice, there may be deviations due to manufacturing tolerances or technical limitations, and those skilled in the art may additionally design regions/layers with different shapes, sizes and relative positions according to actual needs.

In the context of the present disclosure, when a layer/element is referred to as being located "on" a further layer/element, the layer/element may be located directly on the further layer/element, or there may be an intermediate layer/element between them. In addition, if a layer/element is located "on" a further layer/element in one orientation, the layer/element may be located "under" the further layer/element when the orientation is reversed.

A memory device according to the embodiments of the present disclosure is based on a vertical device. The vertical device may include an active region arranged on a substrate in a vertical direction (a direction substantially perpendicular to a substrate surface), and the active region may include source/drain regions arranged at upper and lower ends of the active region and a channel region located between the source/drain regions. A conductive channel may be formed between the source/drain regions through the channel region. In the active region, the source/drain regions and the channel region may be defined, for example, by doping concentrations.

According to the embodiments of the present disclosure, an active region may be defined by a device layer on the substrate. For example, the device layer may be a single semiconductor material layer or a stack of semiconductor material layers. Source/drain regions may be respectively formed at opposite ends of the semiconductor layer or the stack in the vertical direction, and a channel region may be formed in the middle of the semiconductor layer or the stack. A gate stack may extend through the device layer so that the active region may surround a periphery of the gate stack. For a device layer for defining a memory cell (which may be referred to as a "memory device layer"), a gate stack passing therein (which may be referred to as a "first gate stack") may include a memory functional layer such as at least one of a charge trapping material or a ferroelectric material, so as to achieve a memory function. In this way, the first gate stack may cooperate with an opposing active region to define a memory cell. Here, the memory cell may be a flash memory cell. For a device layer for defining a selection transistor (which may be referred to as a "selection device layer"), a gate stack passing therein (which may be referred to as a "second gate stack") may not include a memory functional layer. The first gate stack and the second gate stack may be aligned in the vertical direction. As described below, the first gate stack and the second gate stack may be self-aligned.

A plurality of first gate stacks may be provided to pass through the memory device layer, and a plurality of corresponding second gate stacks may be provided to pass through the selection device layer, thereby defining a plurality of memory devices at intersections of the plurality of first gate stacks and the memory device layer, and defining a plurality of selection transistors at intersections of the plurality of second gate stacks and the selection device layer. In a plane where the memory device layer is located, these memory cells are arranged into an array (for example, generally a two-dimensional array arranged in rows and columns) corresponding to the plurality of first gate stacks.

Since the vertical device is easy to be stacked, the memory device according to the embodiments of the present disclosure may be a three-dimensional (3D) array. Specifically, a plurality of such memory device layers may be arranged in the vertical direction. The first gate stack may extend vertically to pass through the plurality of memory device layers. Accordingly, for a single first gate stack, it intersects the plurality of memory device layers stacked in the vertical direction to define a plurality of memory cells stacked in the vertical direction. The selection device layer may be arranged on an uppermost memory device layer among the plurality of memory device layers.

In a NOR (NOT OR)-type memory device, each memory cell may be connected to a common source line. In view of this configuration, in order to save wiring, each two memory cells adjacent in the vertical direction may share the same source line connection. For example, each of the two adjacent memory cells may have a near end (i.e., an end close to the other of the two memory cells) and a far end (i.e., an end away from the other of the two memory cells). The source/drain region at the near end of each of the two adjacent memory cells may be used as a source region, and thus is electrically connected to the source line, for example, through a common contact portion. The source/drain region at the far end of each of the two adjacent memory cells may be used as a drain region, and the two adjacent memory cells may have their source/drain regions at the far ends being connected to different bit lines respectively.

The device layer may be formed by an epitaxial growth and may be a monocrystalline semiconductor material. Compared with a conventional process of forming a plurality of gate stacks stacked on each other and then forming a vertical active region passing through these gate stacks, it is easier to form an active region (especially the channel region) of monocrystalline in the present disclosure.

Doping of source/drain regions in the memory device layer may be formed by diffusion. For example, solid phase dopant source layers (also used as isolation layers between memory cells) may be provided at opposite ends of each memory device layer, and a dopant in the solid phase dopant source layer may be driven into the memory device layer (for example, the above-mentioned stack or a semiconductor layer grown on a sidewall of the stack), so as to form source/drain regions. Accordingly, a doping distribution of the source/drain region and a doping distribution of the channel region in the memory device layer may be adjusted separately, and steep high source/drain doping may be formed.

A connecting portion may be provided to electrically connect the selection transistor to the corresponding first gate stack. For example, one end of the selection transistor may be connected to a corresponding word line, and the other end of the selection transistor may be connected to a corresponding first gate stack. By turn-on/turn-off of the selection transistor, a gate control voltage on the corresponding word line may be applied to the corresponding first gate stack. A control terminal of the selection transistor may be connected to a selection line. The word lines and the selection lines may be intersected with each other, so that the corresponding first gate stacks may be separately addressed through the word lines and the selection lines.

Such a vertical memory device may be manufactured, for example, as follows. Specifically, at least one memory device layer and a selection device layer may be provided on a substrate. Solid phase dopant source layers may be arranged at upper and lower ends of each memory device layer, so that each memory device layer is located between the solid phase dopant source layers in the vertical direction. These device layers may be provided by an epitaxial growth. During the epitaxial growth, a position of the solid phase dopant source may be defined by a sacrificial layer, and the sacrificial layer may then be replaced by the solid phase dopant source layer. In addition, during the epitaxial growth, in-situ doping may be performed to achieve a desired doping polarity and doping concentration.

A processing channel, which extends vertically with respect to the substrate to pass through each device layer, may be formed. In the processing channel, a sidewall of the sacrificial layer may be exposed so that the sacrificial layer may be replaced by a solid phase dopant source layer. In addition, a dopant may be driven from the isolation layer into opposite ends of the device layer by annealing, so as to form source/drain regions. The solid phase dopant source layer may be replaced by an isolation layer.

A first gate stack overlapping each memory device layer and a second gate stack overlapping the selection device layer on the first gate stack may be formed in the processing channel. As described above, the first gate stack may include a memory functional layer.

The present disclosure may be presented in various forms, some examples of which will be described below. A selection of various materials is involved in the following descriptions. In selecting the materials, in addition to the function of the material (for example, a semiconductor material may be used to form the active region, a dielectric material may be used to form an electrical isolation, and a conductive material may be used to form an electrode, an interconnection structure, etc.), the etching selectivity is considered. In the following descriptions, a required etching selectivity may or may not be indicated. It should be clear to those skilled in the art that when etching a material layer is mentioned below, if it is not mentioned or shown that other layers are also etched, then the etching may be selective, and the material layer may have an etching selectivity with respect to other layers exposed to a same etching recipe.

FIG. 1 to FIG. 19(c) show schematic diagrams of some stages in a process of manufacturing a NOR-type memory device according to the embodiments of the present disclosure.

As shown in FIG. 1, a substrate 1001 is provided. The substrate 1001 may be in various forms, including but not limited to a bulk semiconductor material substrate such as a bulk Si substrate, a semiconductor-on-insulator (SOI) substrate, a compound semiconductor substrate such as a SiGe substrate, and the like. In the following descriptions, for convenience of explanation, a bulk Si substrate such as a Si wafer is taken as an example for description.

A memory device, such as a NOR-type flash memory, may be formed on the substrate 1001 as follows. A memory cell in the memory device may be an n-type device or a p-type device. Here, an n-type memory cell is taken as an example for description. For this purpose, a p-type well may be formed in the substrate 1001. Thus, the following descriptions, especially the descriptions about of a doping type, are for forming the n-type device. However, the present disclosure is not limited to this.

A sacrificial layer $1003_1$ for defining an isolation layer and a memory device layer $1005_1$ for defining an active region of the memory cell may be formed on the substrate 1001, for example, by an epitaxial growth.

Each layer grown on the substrate 1001 may be a monocrystalline semiconductor layer. Because these layers are grown or doped separately, a crystal interface or a doping concentration interface may exist between these layers.

The sacrificial layer $1003_1$ may be subsequently replaced by an isolation layer for isolating a device from the substrate, and a thickness of the sacrificial layer may correspond to a desired thickness of the isolation layer, for example, in a range of about 10 nm to 50 nm. According to a circuit design, the sacrificial layer $1003_1$ may be omitted. The memory device layer $1005_1$ may subsequently define the active region of the memory cell, and may have a thickness of about 40 nm to 200 nm.

These semiconductor layers may contain various suitable semiconductor materials, for example, an elemental semiconductor material such as Si or Ge, or a compound semiconductor material such as SiGe, and the like. Considering the following processes for replacing the sacrificial layer $1003_1$ by an isolation layer, the sacrificial layer $1003_1$ may have an etching selectivity with respect to the memory device layer $1005_1$. For example, the sacrificial layer $1003_1$ may contain SiGe (in which an atomic percentage of Ge is about 15% to 30%, for example), and the memory device layer $1005_1$ may contain Si.

The memory device layer $1005_1$ may be doped in situ when growing. For example, for an n-type device, a p-type doping may be performed, and a doping concentration may be, for example, about 1E17 cm$^{-3}$ to 1E19 cm$^{-3}$. Such doping may define a doping characteristic in the channel region formed subsequently, so as to, for example, adjust a device threshold voltage ($V_t$), control a short channel effect, and the like. Here, the doping concentration may have a non-uniform distribution in the vertical direction, so as to optimize the device performance. For example, the concentration is relatively high in a region close to the drain region (which is then connected to the bit line) to reduce the short channel effect, while the concentration is relatively low in a region close to the source region (which is then connected to the source line) to reduce the channel resistance. This may be achieved by introducing different doses of the dopant in different stages of growth.

A plurality of memory device layers may be provided in order to increase an integration density. For example, memory device layers $1005_2$ and $1005_3$ may be provided on the memory device layer $1005_1$ by an epitaxial growth, and the memory device layers may be separated from each other by sacrificial layers $1003_2$ and $1003_3$ for defining isolation layers. Only three memory device layers are shown in FIG. 1, but the present disclosure is not limited thereto. According to the circuit design, it is possible to omit the isolation layer between certain memory device layers. The memory device layers $1005_2$ and $1005_3$ may have the same or similar thickness and/or material as the memory device layer $1005_1$, or may have different thicknesses and/or materials from the memory device layer $1005_1$. Here, for convenience of descriptions, it is assumed that each memory device layer has the same configuration.

A selection device layer for defining an active region of the selection transistor may be provided on the memory device layer. For example, a first source/drain layer $1007_4$, a channel layer $1005_4$ and a second source/drain layer $1009_4$ may be formed in sequence by an epitaxial growth as the selection device layer. These grown layers may be monocrystalline semiconductor layers.

The first source/drain layer $1007_4$ may then define a (lower) source/drain region of the selection transistor, and may have a thickness in a range of, for example, about 30 nm to 200 nm. The channel layer $1005_4$ may then define a channel region of the selection transistor, and may have a thickness in a range of, for example, about 30 nm to 100 nm. The second source/drain layer $1009_4$ may then define an (upper) source/drain region of the selection transistor, and may have a thickness in a range of, for example, about 10 nm to 100 nm. Here, the first source/drain layer $1007_4$ is relatively thick, which may facilitate a fabrication of a gate stack connecting portion for selection transistor and memory cell in subsequent processes.

The first source/drain layer $1007_4$ and the second source/drain layer $1009_4$ may be doped in situ when growing. For example, for an n-type device, an n-type doping may be performed, and a doping concentration may be, for example, about 1E19 cm$^{-3}$ to 1E21 cm$^{-3}$. Such doping may define a doping characteristic in the source/drain region of the selection transistor. Similarly, the channel layer $1005_4$ may be doped in situ when growing. For example, for an n-type device, a p-type doping may be performed, and a doping concentration may be, for example, about 1E17 cm-3 to 1E19 cm$^{-3}$. Such doping may define a doping characteristic in the channel region formed subsequently, so as to, for example, adjust $V_t$ of the device, control the short channel effect, and the like.

A sacrificial layer $1003_4$ for defining an isolation layer may be further provided between the selection device layer and the memory device layer $1005_3$. As for the sacrificial layers $1003_2$ to $1003_4$, reference may be made to the above descriptions for the sacrificial layer $1003_1$.

As described above, considering the following processes for replacing the sacrificial layer by an isolation layer, the selection device layer may have an etching selectivity with respect to the sacrificial layer $1003_4$ (and sacrificial layers $1003_1$ to $1003_3$, which may contain the same material such as SiGe). For example, the first source/drain layer $1007_4$, the channel layer $1005_4$ and the second source/drain layer $1009_4$ may contain Si. Here, each layer in the selection device layer contains the same material, so that the active region of the selection transistor may be defined by a same etching step in the subsequent processes. However, the present disclosure is not limited thereto. Adjacent layers in the selection device layer may also have etching selectivity with respect to each other.

In such embodiments, the memory device layers $1005_1$, $1005_2$ and $1005_3$ may be formed by a single epitaxial layer, and source/drain regions may be then defined therein by diffusion doping, which will be further described below. However, the present disclosure is not limited thereto. For example, at least one of the memory device layers $1005_1$, $1005_2$ and $1005_3$ may be formed in a form of the selection device layer, including a first source/drain layer, a channel layer and a second source/drain layer that are stacked in sequence. In this case, the following processes may also be performed, but the diffusion doping process may not be performed (certainly, the diffusion doping process may also be performed, for example, to adjust doping characteristics of the source/drain regions).

In addition, in such embodiments, the selection device layer includes portions $1007_4$, $1005_4$ and $1009_4$ that are doped in situ to different doping characteristics during the epitaxial growth. However, the present disclosure is not limited thereto. For example, the selection device layer may be formed by a single epitaxial layer, like the memory device layers $1005_1$, $1005_2$ and $1005_3$, and the source/drain regions may be then defined therein by diffusion doping.

For convenience of patterning, a hard mask layer 1015 may be provided on these layers formed on the substrate 1001. For example, the hard mask layer 1015 may contain a nitride (e.g., silicon nitride) and may have a thickness in a range of about 100 nm to 300 nm.

In the following, on one hand, a processing channel that may reach the sacrificial layer is required, so that the sacrificial layer may be replaced by an isolation layer; and on the other hand, it is required to define a region for forming a gate. According to the embodiments of the present disclosure, the two aspects may be performed in combination. Specifically, a gate region may be defined by using the processing channel.

Figure 2A:
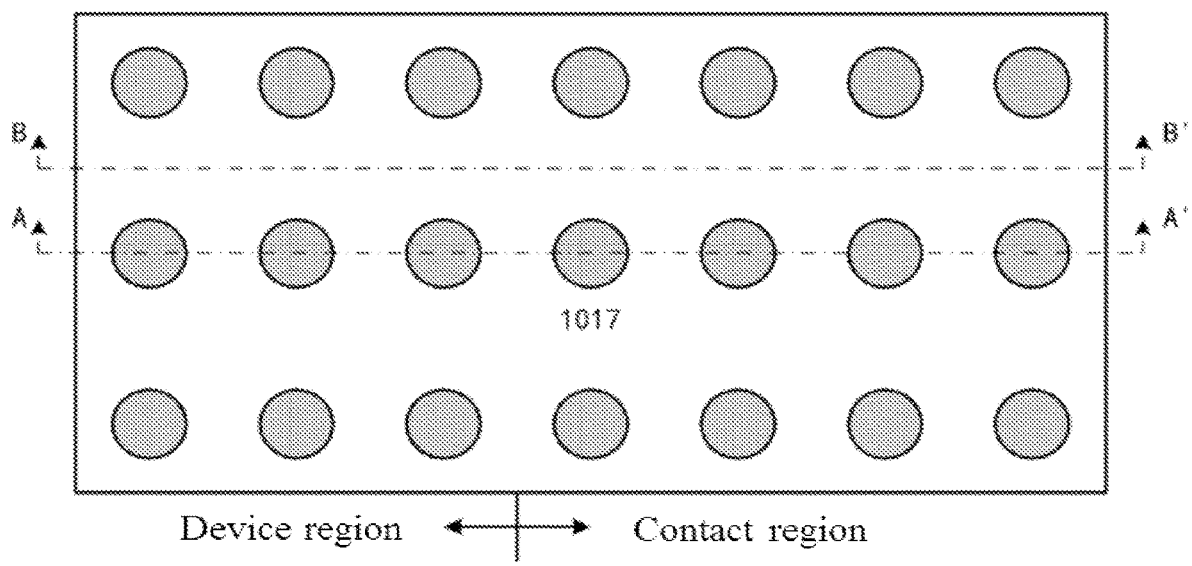
FIGS. 2(a), 7(a), 8(a), 13(a), 18(a) and 19(a) are top views.
Figure 2B:
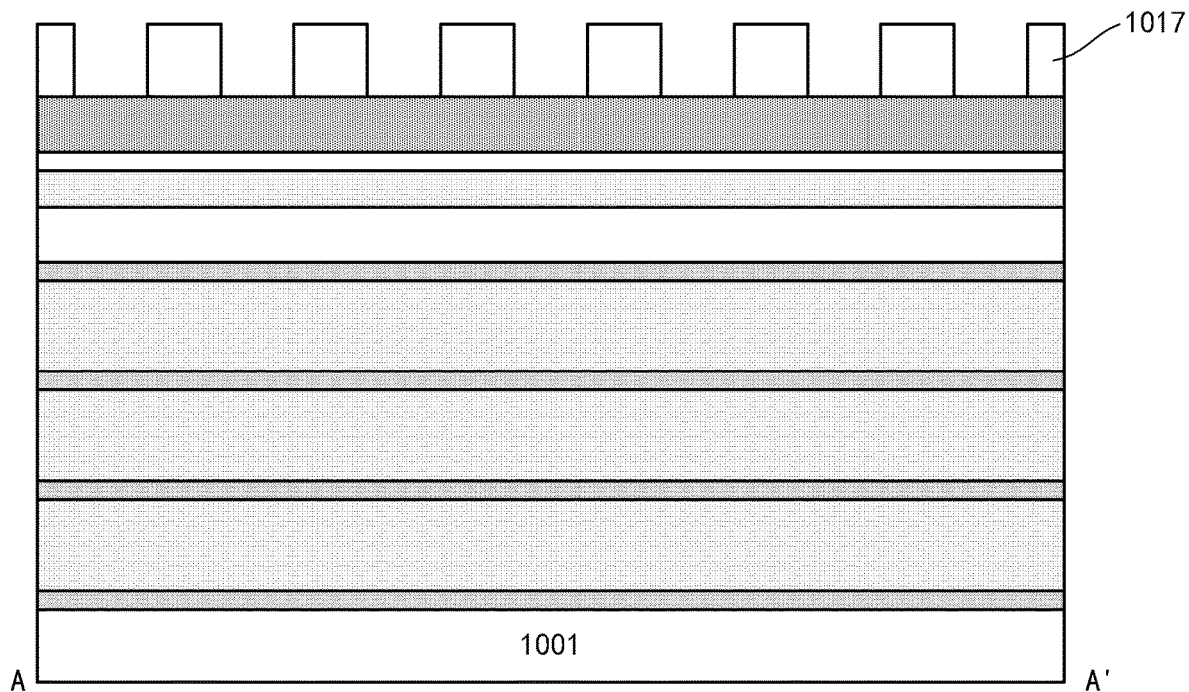

For example, as shown in FIG. 2(a) and FIG. 2(b), a photoresist 1017 may be formed on the hard mask layer 1015 and may be patterned by photolithography to have a plurality of openings, and these openings may define positions of processing channels. The opening may have various suitable shapes, such as circle, rectangle, square, polygon, etc. and has a suitable size, such as a diameter or a side length in a range of about 20 nm to 500 nm. Here, these openings (especially in the device region) may be arranged in a form of an array, for example, a two-dimensional array in a horizontal direction and a vertical direction in paper in FIG. 2(a). The array may then define an array of memory cells. FIG. 2(a) shows openings formed on the substrate (including a device region for subsequently fabricating memory cells and a contact region for subsequently fabricating contact portions) with a substantially uniform size and a substantially uniform density, but the present disclosure is not limited thereto. The size and/or density of the openings may be changed. For example, a density of openings in the contact region may be less than a density of openings in the device region, so as to reduce a resistance in the contact region.

Figure 3:
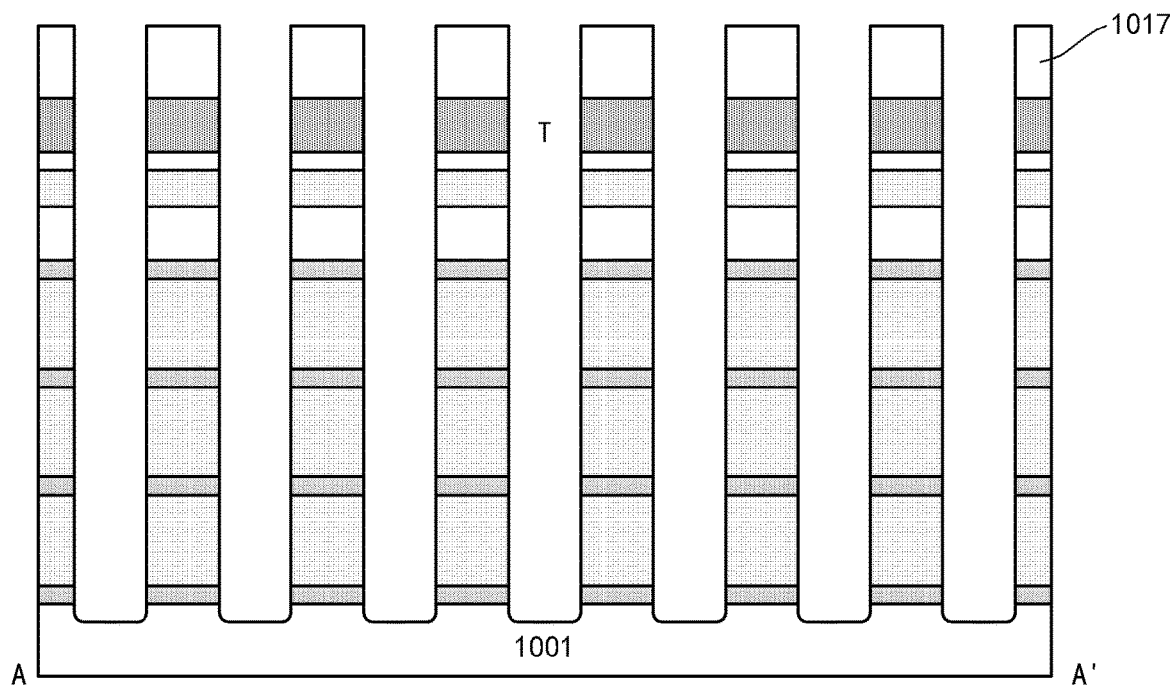

As shown in FIG. 3, the layers on the substrate 1001 may be etched, using the photoresist 1017 patterned in such manner as an etching mask, by an anisotropic etching such as Reactive Ion Etching (RIE), so as to form a processing channel T. The RIE may be performed in a substantially vertical direction (e.g., a direction perpendicular to the substrate surface) and may be performed into the substrate 1001. Accordingly, a plurality of vertical processing channels T may be formed on the substrate 1001. The processing channels T in the device region may further define a gate region. After that, the photoresist 1017 may be removed.

Then, a sidewall of the sacrificial layer is exposed in the processing channel T. The sacrificial layer may be then replaced by an isolation layer via the exposed sidewall. Considering a function of supporting the memory device layers $1005_1$ to $1005_3$ and the selection device layer during replacement, a support layer may be formed.

Figure 4:
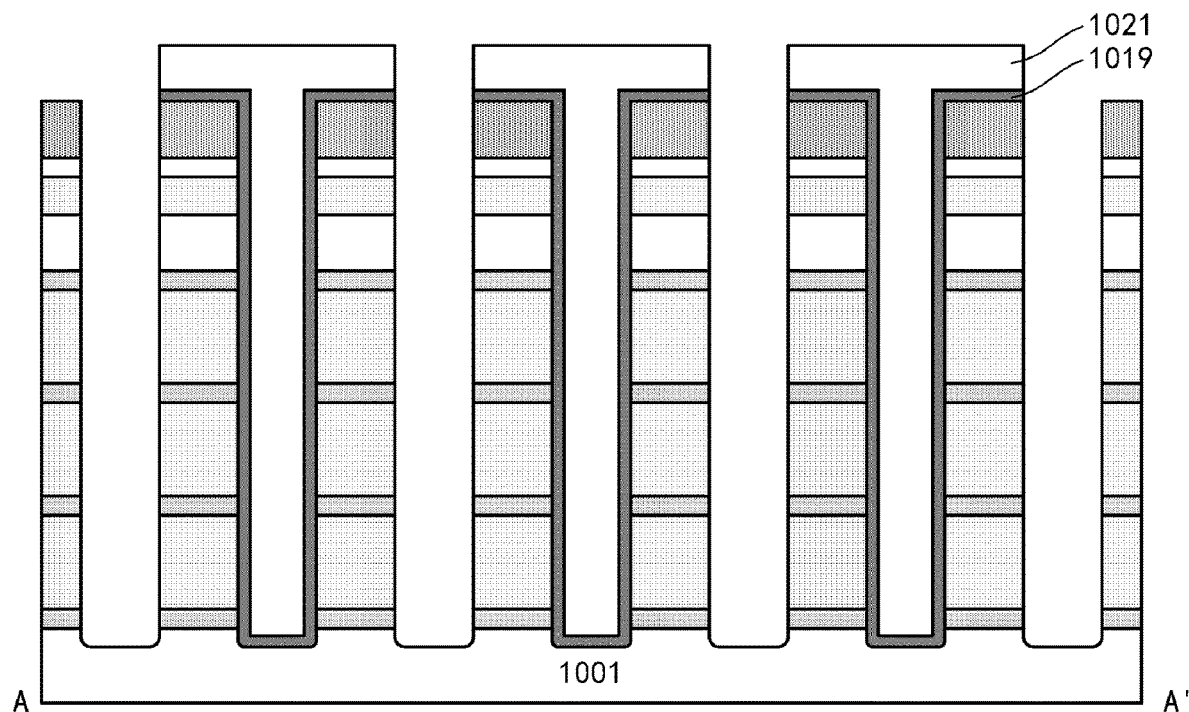

For example, as shown in FIG. 4, a support material layer may be formed on the substrate 1001, for example, by a deposition such as Chemical Vapor Deposition (CVD). The support material layer may be formed in a substantially conformal manner. Considering the etching selectivity, especially the etching selectivity with respect to the hard mask layer 1015 (a nitride in this example) and the subsequently formed isolation layer (an oxide in this example), the support material layer may contain, for example, SiC. For example, by forming a photoresist 1021 and performing a selective etching such as RIE with the photoresist 1021, a part of the support material layer in one or more of processing channels T may be removed while a part of the support material layer in the rest of processing channels T may be retained. The remaining part of the support material layer may form a support layer 1019. In this way, on one hand, the sacrificial layer may be replaced through the processing channels in which the support layer 1019 is not formed, and on the other hand, the memory device layers $1005_1$ to $1005_3$ and the selection device layer may be supported by the support layer 1019 in the rest of processing channels. After that, the photoresist 1021 may be removed.

An arrangement of the processing channels in which the support layer 1019 is formed and the processing channels in which the support layer 1019 is not formed may be achieved by a pattern of the photoresist 1021. In addition, the processing channels in which the support layer 1019 is formed and the processing channels in which the support layer 1019 is not formed may be substantially evenly distributed for process consistency and uniformity. As shown in FIG. 4, the processing channels in which the support layer 1019 is formed and the processing channels in which the support layer 1019 is not formed may be arranged alternately.

Figure 5:
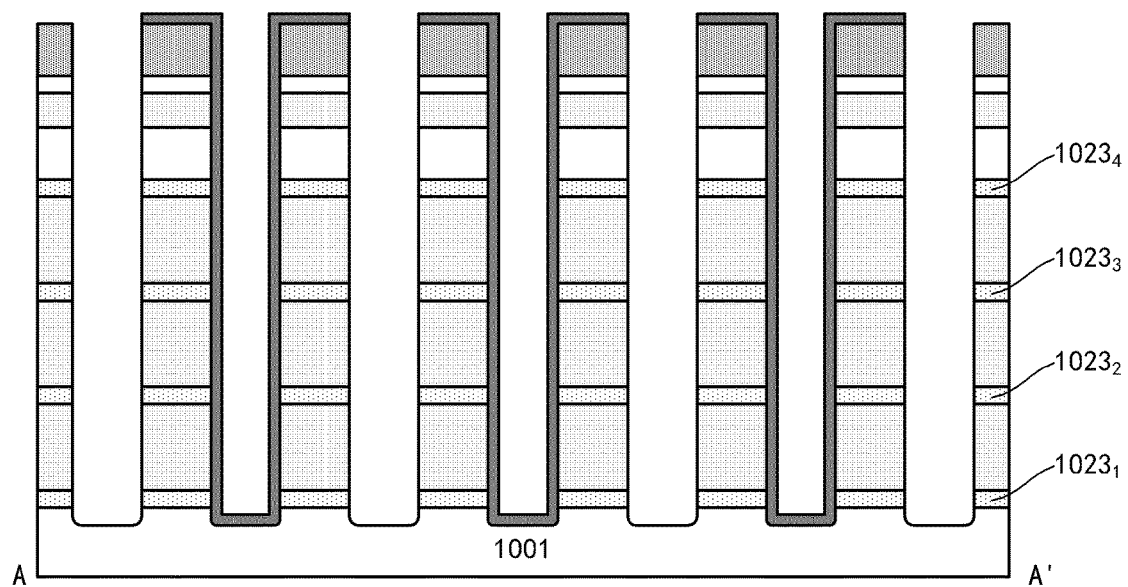

Then, as shown in FIG. 5, the sacrificial layers $1003_1$ to $1003_4$ may be removed by a selective etching via the processing channel T. Due to an existence of the support layer 1019, the memory device layers $1005_1$ to $1005_3$ and the selection device layer may be kept from collapsing. Gaps formed by the removal of the sacrificial layers may be filled with a dielectric material by, for example, a process of depositing (preferable ALD to better control a film thickness) and then etching back (e.g., RIE in the vertical direction), so as to form isolation layers $1023_1$, $1023_2$, $1023_3$ and $1023_4$.

According to the embodiments of the present disclosure, in order to achieve the source/drain doping, the isolation layers $1023_1$ to $1023_4$ may contain a dopant (an n-type dopant for an n-type memory cell and a p-type dopant for a p-type memory cell). Accordingly, the isolation layers $1023_1$ to $1023_4$ may be solid phase dopant source layers. For example, the isolation layers $1023_1$ to $1023_4$ may contain phosphosilicate glass (PSG) having a phosphorus (P) content of about 0.1% to 10% (for an n-type memory cell) or borosilicate glass (BSG) having a boron (B) content of about 0.1% to 10% (for a p-type memory cell).

In this example, the source/drain doping is achieved by the solid phase dopant source layer instead of in-situ doping, so that a steep high source/drain doping may be achieved, and a possible cross contamination caused by in-situ growth during epitaxial growth may be inhibited.

After that, the support layer 1019 may be removed by a selective etching.

A gate stack of the memory cell may be formed in the processing channel, especially in the processing channel in the device region. Here, in order to form a memory device, a memory function may be achieved by the gate stack. For example, the gate stack may include a memory structure, such as a charge trapping material or a ferroelectric material.

Figure 6:
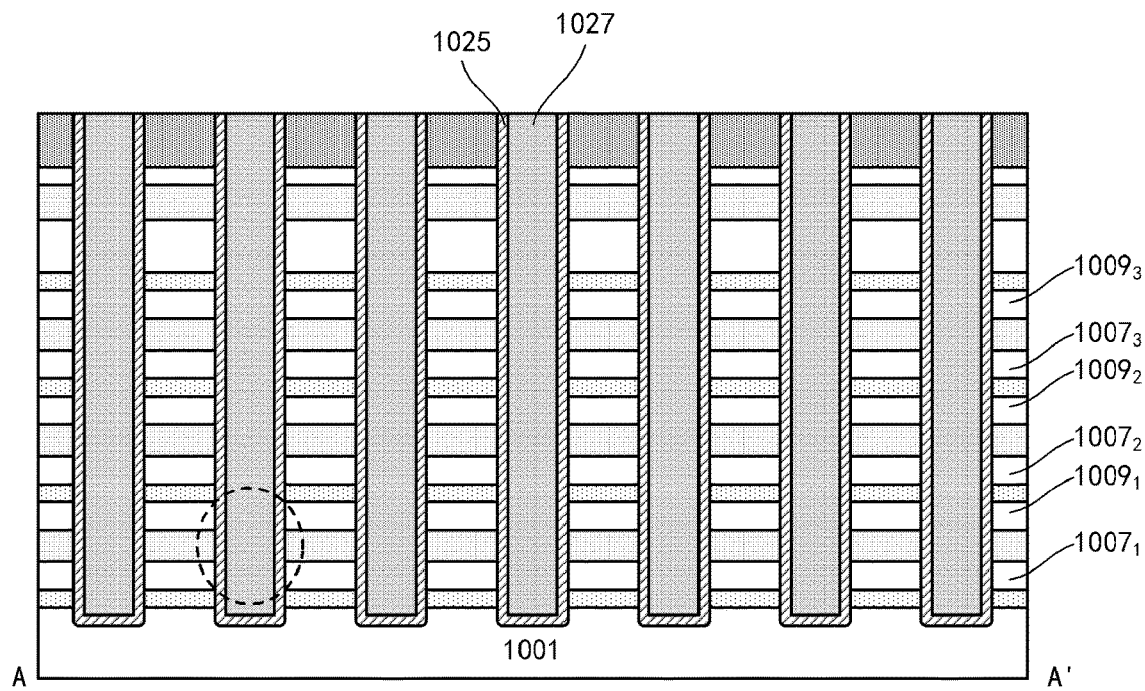

As shown in FIG. 6, a memory functional layer 1025 and a gate conductor layer 1027 may be formed in sequence, for example, by a deposition. The memory functional layer 1025 may be formed in a substantially conformal manner, and a gap left in the processing channel T after the memory functional layer 1025 is formed may be filled with the gate conductor layer 1027. A planarization process such as chemical mechanical polishing (CMP) may be performed on the gate conductor layer 1027 and the memory functional layer 1025 (the CMP may stop at the hard mask layer 1015, for example), so that the gate conductor layer 1027 and the memory functional layer 1025 may be left in the processing channel T to form a gate stack.

The memory functional layer 1025 may be based on a dielectric charge trapping, a ferroelectric material effect, or a bandgap engineering charge memory (SONOS), etc. For example, the memory functional layer 1025 may include a dielectric tunneling layer (e.g., an oxide with a thickness in a range of about 1 nm to 5 nm, which may be formed by an oxidation or ALD), a band-offset layer (e.g., a nitride with a thickness in a range of about 2 nm to 10 nm, which may be formed by CVD or ALD), and an isolation layer (e.g., an oxide with a thickness in a range of about 2 nm to 6 nm, which may be formed by an oxidation, CVD or ALD). Such a three-layer structure may result in a band structure that may trap electrons or holes. Alternatively, the memory functional layer 1025 may include a ferroelectric material layer, such as $HfZrO_2$ with a thickness in a range of about 2 nm to 20 nm.

The gate conductor layer 1027 may contain, for example, a (doped, e.g., p-type doped in a case of an n-type device) polycrystalline silicon or a metal gate material.

An annealing process may be performed to drive the dopant in the solid phase dopant source layer into the memory device layer. For each of the memory device layers $1005_1$ to $1005_3$, the dopant in the isolation layers at upper and lower ends of the memory device layer may enter the memory device layer from the upper and lower ends respectively, so that highly doped regions $1007_1$, $1009_1$; $1007_2$, $1009_2$; $1007_3$, $1009_3$ may be formed at the upper and lower ends (e.g., n-type doping in a range of about 1E19 $cm^{-3}$ to 1E21 $cm^{-3}$), so as to define the source/drain regions. A diffusion depth of the dopant from the isolation layer to the memory device layer may be controlled (e.g., to be in a range of about 10 nm to 50 nm), so that a relatively low doping may be kept in the middle of each memory device layer in the vertical direction, for example, a doping polarity (e.g., a p-type doping) and a doping concentration (e.g., in a range of $1E17$ $cm^{-3}$ to $1E19$ $cm^{-3}$) caused by the in-situ doping during growth may be substantially kept, and the channel region may be defined. Certainly, the dopant in the isolation layer 1023₄ may also enter into the selection device layer, especially the first source/drain layer 1007₄ in the selection device layer.

The doping concentration achieved by the in-situ doping is generally less than $1E20$ $cm^{-3}$. According to the embodiments of the present disclosure, the source/drain doping is performed by the diffusion from the solid phase dopant source layer, which may achieve a high doping. For example, a maximum doping concentration may be greater than $1E20$ $cm^{-3}$, even up to a range of about $7E20$ $cm^{-3}$ to $3E21$ $cm^{-3}$. Moreover, due to the diffusion characteristic, the source/drain region may have a doping concentration gradient that decreases from a side of the source/drain region close to the solid phase dopant source layer to a side of the source/drain region close to the channel region in the vertical direction.

Such diffusion doping may achieve a steep doping concentration distribution. For example, there may be a sharp change in doping concentration between the source/drain region and the channel region, e.g. less than about 5 nm/dec to 20 nm/dec (that is, a decrease of the doping concentration by at least one order of magnitude occurs in a range of less than about 5 nm to 20 mm). The region having such sharp change in the vertical direction may be called an "interface layer".

Since the diffusion from the isolation layer into the memory device layer has substantially the same diffusion characteristic, each of the source/drain regions 1007₁, 1009₁; 1007₂, 1009₂; 1007₃, 1009₃ may be substantially coplanar in a transverse direction. Similarly, each channel region may be substantially coplanar in the transverse direction. In addition, as described above, the channel region may have a non-uniform distribution in the vertical direction. The doping concentration in a region of the channel region close to the source/drain region (drain region) on one side of the channel region is relatively high, while the doping concentration in a region of the channel region close to the source/drain region (source region) on the other side of the channel region is relatively low.

As shown in FIG. 6, the gate stack (1025/1027) including the memory functional layer is surrounded by the memory device layers. The gate stack is cooperated with the device layers to define the memory cell, as shown by a dashed circle in FIG. 6. The channel region may be connected to the source/drain regions at opposite sides of the channel region, and the channel region may be controlled by the gate stack. In a single memory cell, one of the source/drain regions at upper and lower ends may serve as the source region and may be electrically connected to the source line; and the other may serve as the drain region and may be electrically connected to the bit line. For each two adjacent memory cells in the vertical direction, a source/drain region at an upper end of the lower one of the two memory cells and a source/drain region at a lower end of the upper one of the two memory cells may be used as source regions, and thus may share the same source line connection.

The gate stack may extend in a column shape in the vertical direction and overlap with a plurality of (which is three in this example) memory device layers, so as to define a plurality of memory cells stacked on each other in the vertical direction. The memory cells associated with a single gate stack column may form a memory cell string. Corresponding to an arrangement of the gate stack columns (corresponding to the arrangement of processing channels T described above, e.g., a two-dimensional array), a plurality of such memory cell strings are arranged on the substrate, so as to form a three-dimensional (3D) array of memory cells.

At an upper end of each memory cell string (in the device region), a selection transistor may be fabricated based on the selection device layer.

According to the embodiments of the present disclosure, the selection transistor may be formed based on the processing channel T. For example, a gate stack of the selection transistor may be formed in the processing channel T, and an active region of the selection transistor surrounds the gate stack, similar to the memory cell. In this way, the resulting selection transistor may be self-aligned to the memory cell string located below.

The active regions of the selection transistors of the memory cell strings may be electrically isolated from each other, so as to achieve an independent selection of each memory cell string. To this end, the selection device layer may be separated into localized portions surrounding the corresponding processing channels T, which serve as the active regions of the selection transistors.

Figure 7A:
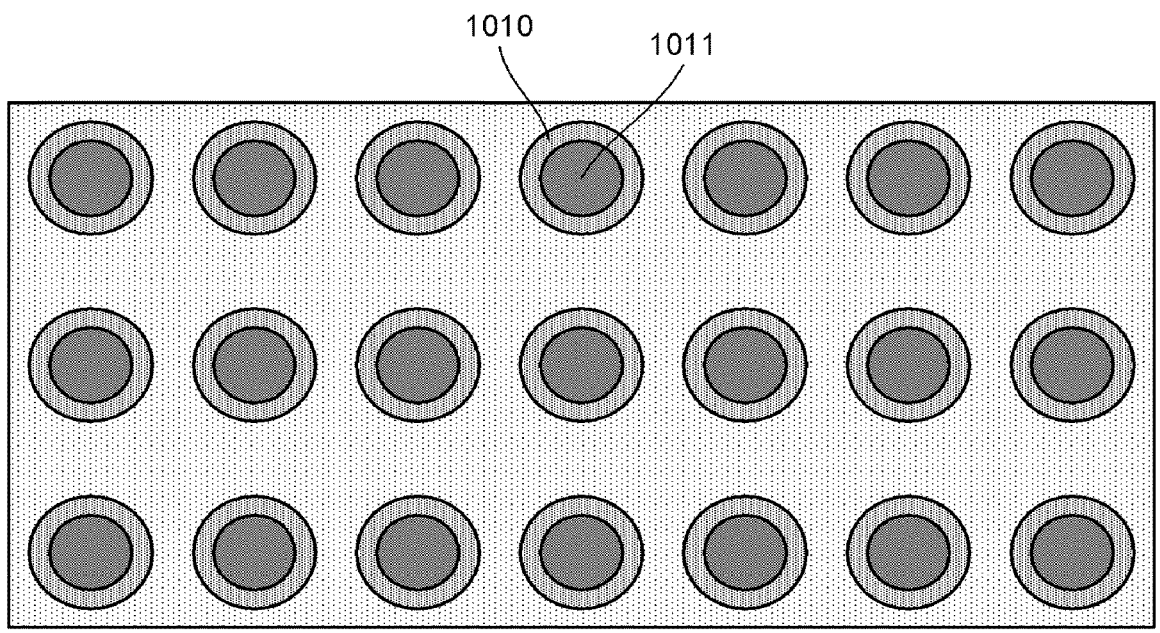
Figure 7B:
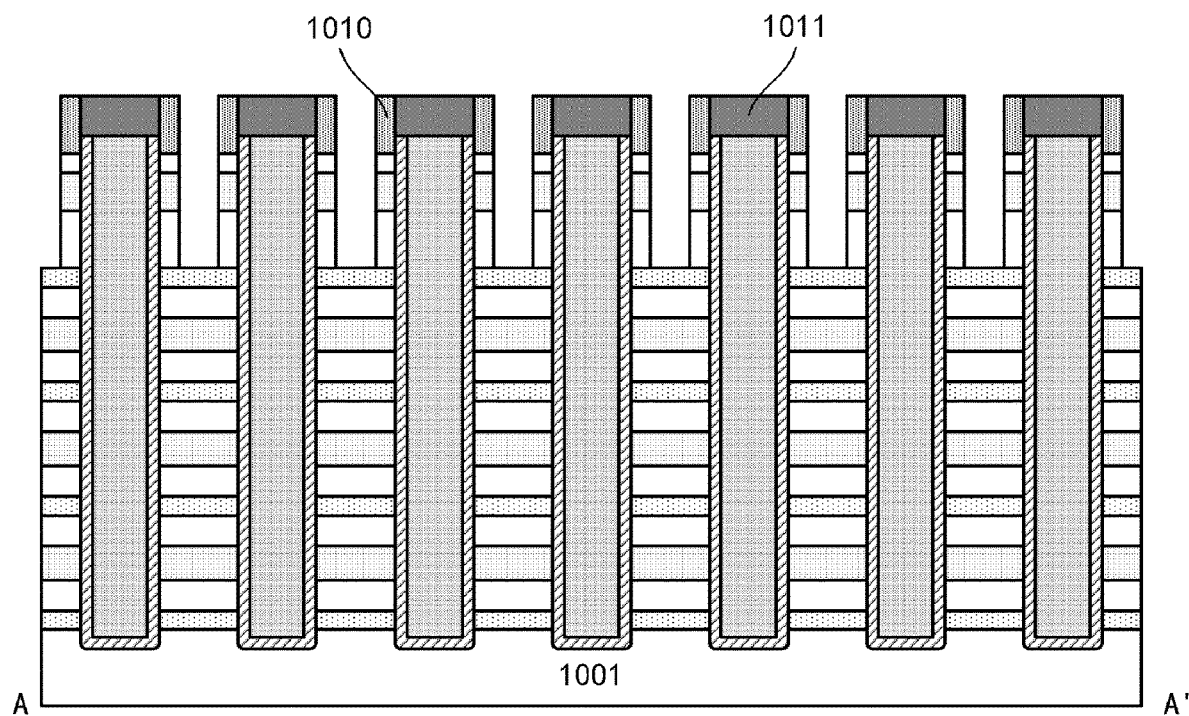

In order to better provide a position reference when localizing the selection device layer and avoid affecting the gate stack (1025/1027) of the memory cell (for example, especially in a case that the gate conductor layer 1027 contains polycrystalline silicon), as shown in FIG. 7(*a*) and FIG. 7(*b*), the gate stack (1025/1027) of the memory cell may be etched back by a certain thickness by an anisotropic etching such as RIE in the vertical direction. A space left by the etching back in the processing channel T may be filled with a cap layer 1011 by a method of, for example, deposition followed by planarization (e.g., CMP, which may stop at the hard mask layer 1015). The cap layer 1011 may contain, for example, SiC, in consideration of the etching selectivity (for example, the etching selectivity with respect to the hard mask layer 1015 such as nitride and the isolation layer such as oxide). Here, a bottom surface of the cap layer 1011 may be higher than a bottom surface of the hard mask layer 1015, so that the cap layer 1011 may be limited in a processing channel portion defined by the hard mask layer 1015, and may be self-aligned to the gate stack of the memory cell located below. The cap layer 1011 formed in this manner may be used as a position reference of the active region of the selection transistor.

A mask that includes separate portions respectively surrounding the processing channels T may be formed to define the active regions of the selection transistors. Here, a self-aligned mask may be formed by a spacer forming process.

For example, the hard mask layer 1015 may be removed by a selective etching. Accordingly, the cap layer 1011 presents in form of island shape that is protruded with respect to the selection device layer and self-aligned to the gate stack of the memory cell. A spacer 1010 may be formed on a sidewall of such a protruding island-shaped portion as a mask. For example, a layer of dielectric such as a nitride (to have etching selectivity with respect to the cap layer 1011 and the isolation layer) may be deposited in a substantially conformal manner, and then an anisotropic etching such as RIE in the vertical direction may be performed on the deposited dielectric to remove a transverse extending portion of the deposited dielectric and remain a vertical extending portion of the deposited dielectric, thereby forming the spacer 1010. A thickness (a dimension in the horizontal direction in the figures) of the spacer 1010 may define a size of the active region of the selection transistor and may be, for example, in a range of about 5 nm to 20 nm.

An anisotropic etching such as RIE in the vertical direction may be performed on the selection device layer by using the spacer 1010 as an etching mask. The RIE may stop at the isolation layer 1023$_4$. Accordingly, the selection device layer (the first source/drain layer 1007$_4$, the channel layer 1005$_4$ and the second source/drain layer 1009$_4$) may be separated into localized portions respectively surrounding the processing channels T. These localized portions may define the active regions of the selection transistors corresponding to the memory cell strings.

A lower source/drain region of the selection transistor may be electrically connected to the gate stack of the corresponding memory cell string (which will be further described below), and an upper source/drain region of the selection transistor may be electrically connected to a word line. Accordingly, a gate control voltage applied on each word line may be applied to the gate stack of the corresponding memory cell string via the corresponding selection transistor.

Figure 8A:
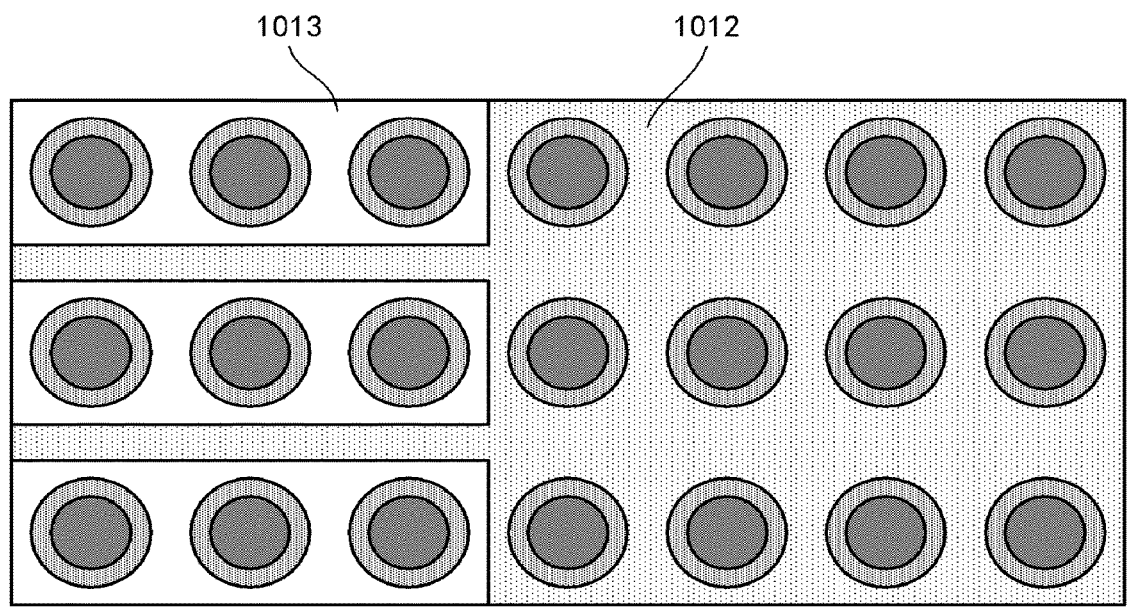
Figure 8B:
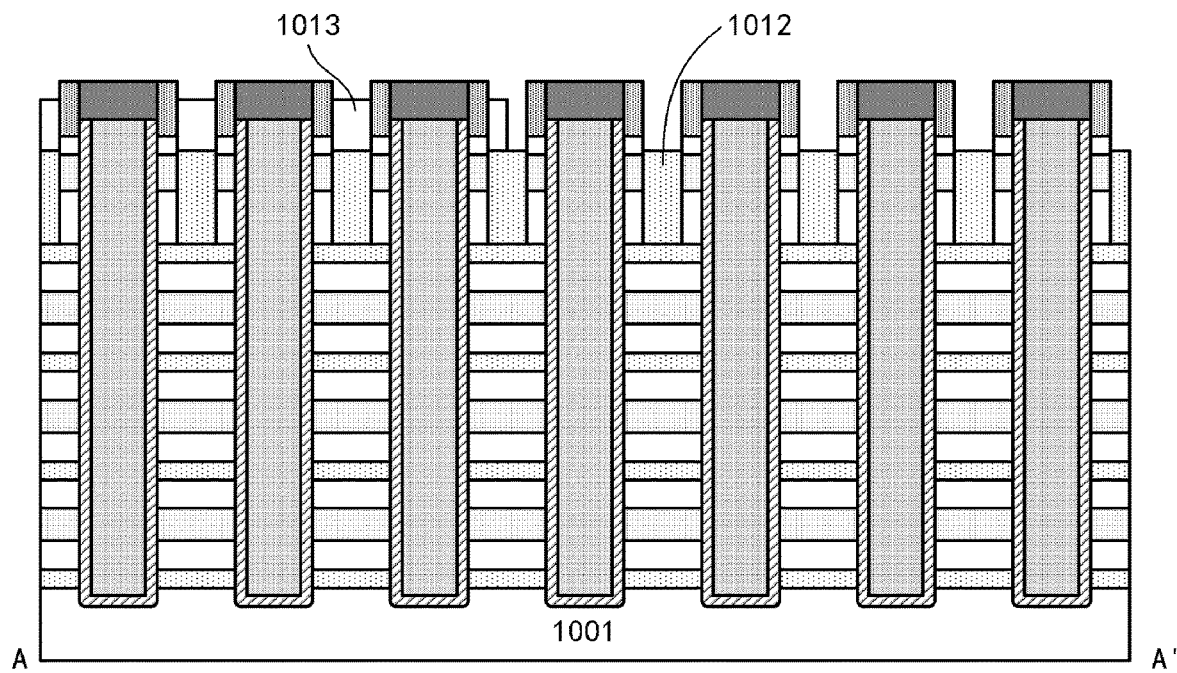

Here, a word line electrically connected to the upper source/drain region of the selection transistor may be fabricated. For example, as shown in FIG. 8(*a*) and FIG. 8(*b*), an isolation layer 1012 may be formed on the isolation layer 1023$_4$. The isolation layer 1012 may be formed by depositing, for example, an oxide, then performing a planarization such as CMP on the deposited oxide (the CMP may stop at the cap layer 1011), and then etching back the planarized oxide. The isolation layer 1012 may shield the first source/drain layer 1007$_4$ and the channel layer 1005$_4$, while exposing at least a part of the second source/drain layer 1009$_4$, so that the word line subsequently formed thereon may be electrically connected to the second source/drain layer 1009$_4$ and electrically isolated from the first source/drain layer 1007$_4$ and the channel layer 1005$_4$. A word line 1013 may be formed on the isolation layer 1012. The word line 1013 may contain a conductive material such as metal, and may be formed by, for example, deposition followed by etching, or a dual damascene process, or the like. The word line 1013 may be in contact with and thus electrically connected to an exposed portion of the second source/drain layer 1009$_4$. According to the embodiments, before the formation of the word line 1013, a silicidation process may be performed on the exposed portion of the second source/drain layer 1009$_4$ to form a silicide, so as to reduce a contact resistance between the second source/drain layer 1009$_4$ and the word line 1013.

As shown in the top view in FIG. 8(*a*), a plurality of word lines 1013 may be formed as strips extending in a first direction (a horizontal direction on the paper plane in FIG. 8(*a*)), and arranged in a second direction (a vertical direction on the paper plane in FIG. 8(*a*)) intersecting (e.g., perpendicular to) the first direction. Here, the word lines 1013 may be formed in the device region without extending into the contact region, so as to avoid mutual interference with contact portions subsequently formed in the contact region.

Figure 9:
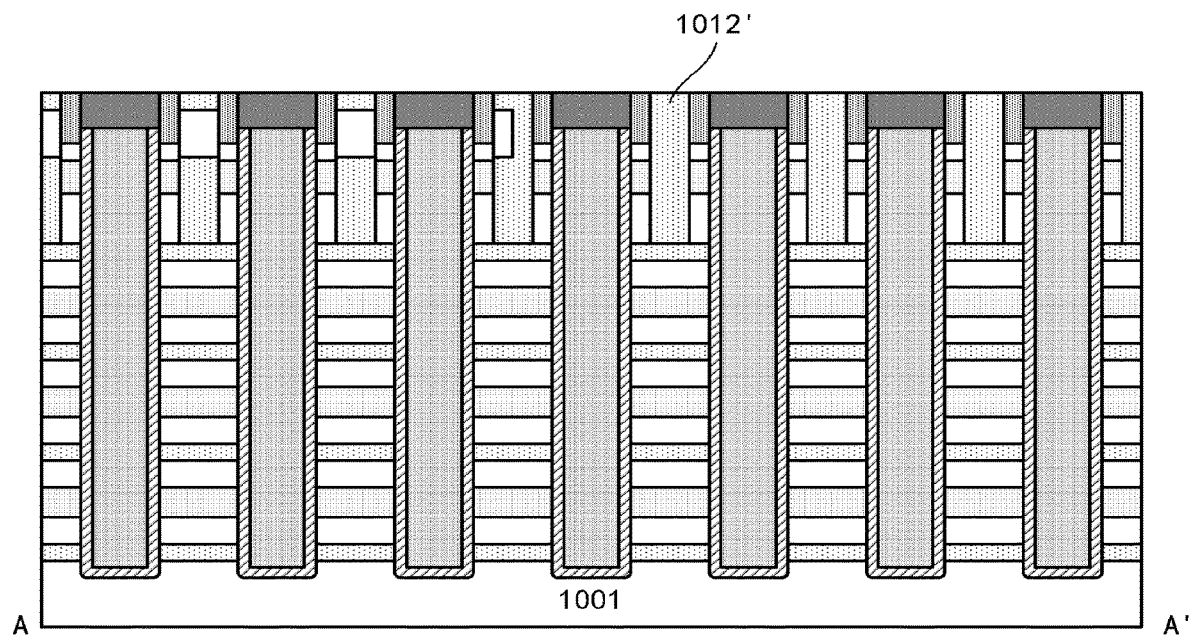

As shown in FIG. 9, a gap in a current structure may be filled with a dielectric to facilitate further processing. Such filling may be performed by, for example, deposition followed by planarization. The filled dielectric may contain a material identical to a material of the isolation layer 1012, such as an oxide, and thus, they are shown as integral and denoted by 1012' in FIG. 9.

The gate stack of the selection transistor may be formed in the processing channel T at a height corresponding to the selection device layer (especially the channel layer 1005$_4$ therein).

Figure 10:
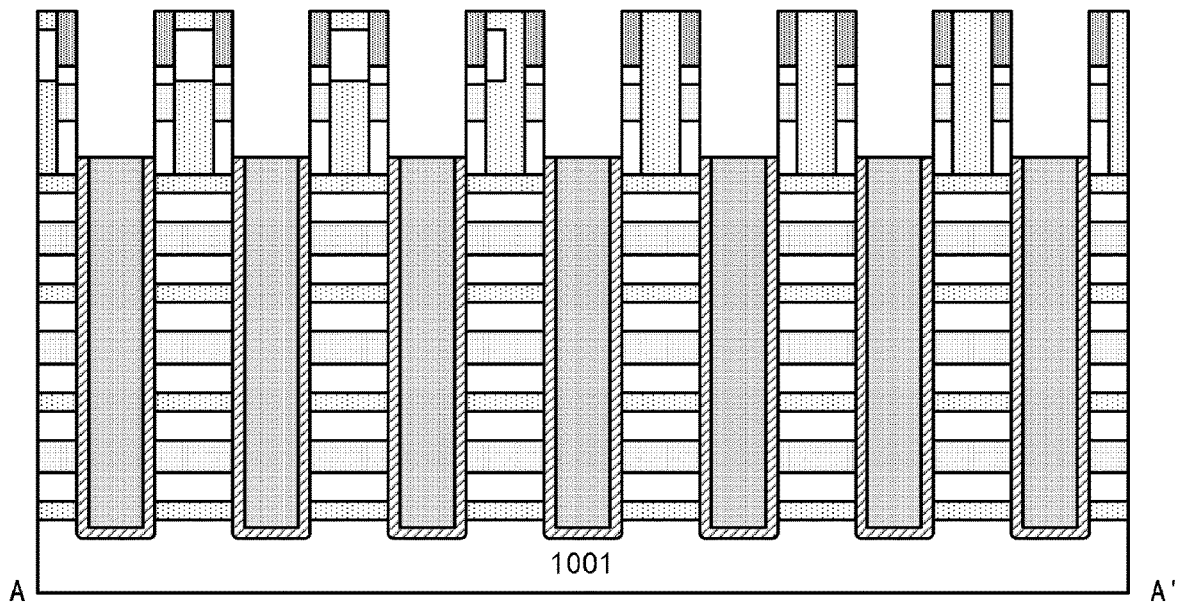

For example, as shown in FIG. 10, the cap layer 1011 may be removed by a selective etching to expose the gate stack of the memory cell. The gate stack of the memory cell may be recessed to a certain depth by a selective etching. Here, on one hand, a top surface of the recessed gate stack of the memory cell may be lower than a bottom surface of the channel layer 1005$_4$, so that the gate stack of the selection transistor formed subsequently may overlap with an entire height of the channel layer 1005$_4$; on the other hand, the top surface of the recessed gate stack of the memory cell may be higher than a top surface of an uppermost memory device layer (preferably higher than the top surface of the uppermost isolation layer 1023$_4$), so as to avoid an undesired electrical connection between the uppermost memory device layer and a subsequently formed gate stack connecting portion for selection transistor and memory cell.

In this way, an upper space of each processing channel T is released. The gate stacks of the selection transistors may be formed in these released spaces.

Figure 11:
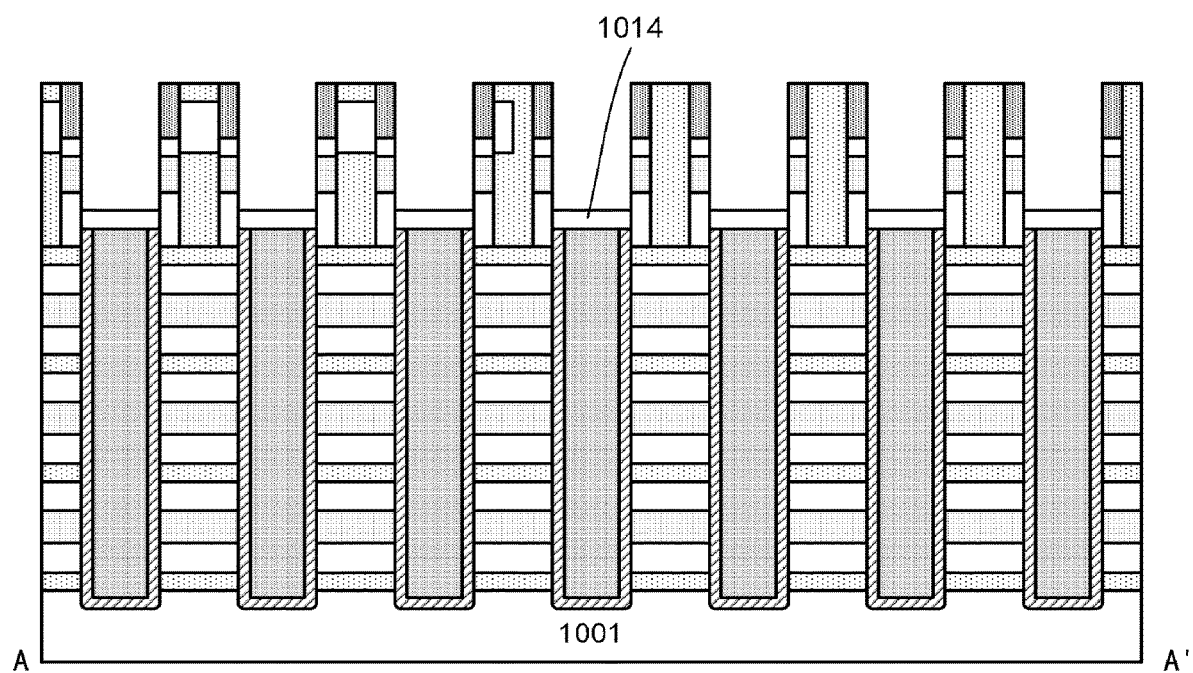

Considering the electrical connection between the gate stack of the selection transistor and the gate stack of the memory cell, as shown in FIG. 11, a gate stack connecting portion 1014 for selection transistor and memory cell may be formed in each processing channel T. The gate stack connecting portion 1014 for selection transistor and memory cell may contain a conductive material, for example, a metal such as tungsten (W). The gate stack connecting portion 1014 for selection transistor and memory cell may be formed by, for example, deposition followed by etching back. The gate stack connecting portion 1014 for selection transistor and memory cell may be a conductive layer on a top surface of the gate stack of the memory cell in each processing channel T. The conductive layer is in contact with the gate stack of the memory cell (especially the gate conductor layer 1027 therein) at a bottom surface, and in contact with the first source/drain layer 1007$_4$ at a side surface. A top surface of the gate stack connecting portion 1014 for selection transistor and memory cell may be lower than a top surface of the first source/drain layer 1007$_4$.

Figure 12:
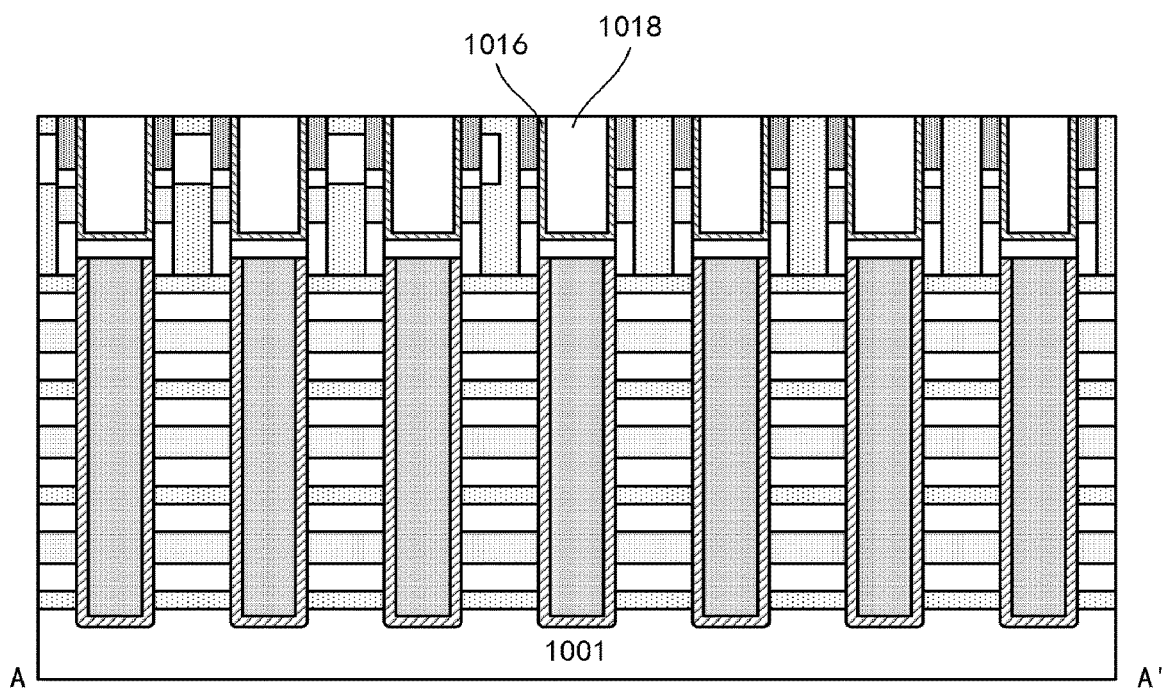

As shown in FIG. 12, the gate stack of the selection transistor may be formed on the gate stack connecting portion 1014 for selection transistor and memory cell in each processing channel T. As described above with reference to FIG. 6, a gate dielectric layer 1016 and a gate conductor layer 1018 may be formed in sequence. Here, the gate stack (1016/1018) of the selection transistor may not have a memory function. For example, the gate dielectric layer 1016 may contain an oxide or a high-k dielectric, and the gate conductor layer 1018 may contain (doped) polycrystalline silicon or metal.

The gate stack (1016/1018) of the selection transistor is surrounded by the selection device layer (the first source/drain layer 1007$_4$, the channel layer 1005$_4$ and the second source/drain layer 1009$_4$), thereby defining the selection transistor. The upper source/drain region (the second source/drain layer 1009$_4$) of the selection transistor is electrically connected to the word line 1013, and the lower source/drain region (the first source/drain layer 1007$_4$) of the selection transistor is electrically connected to the gate stack (1025/1027) of the corresponding memory cell string via the gate stack connecting portion 1014 for selection transistor and memory cell.

In this way, the fabrication of devices (including memory cells and selection transistors) in the device region is completed.

Then, various electrical contact portions may be fabricated (in the contact region) to achieve desired electrical connections.

A stepped structure may be formed in the contact region to achieve an electrical connection to each memory device layer. Such a stepped structure may be formed in various manners in the art. According to the embodiments of the present disclosure, the stepped structure may be formed as follows, for example.

Figure 13A:
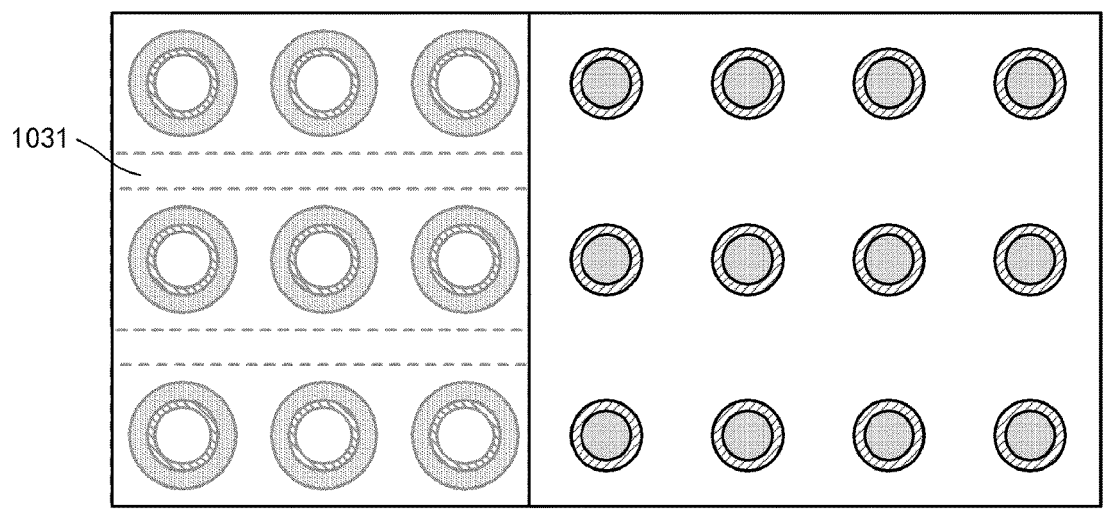
Figure 13B:
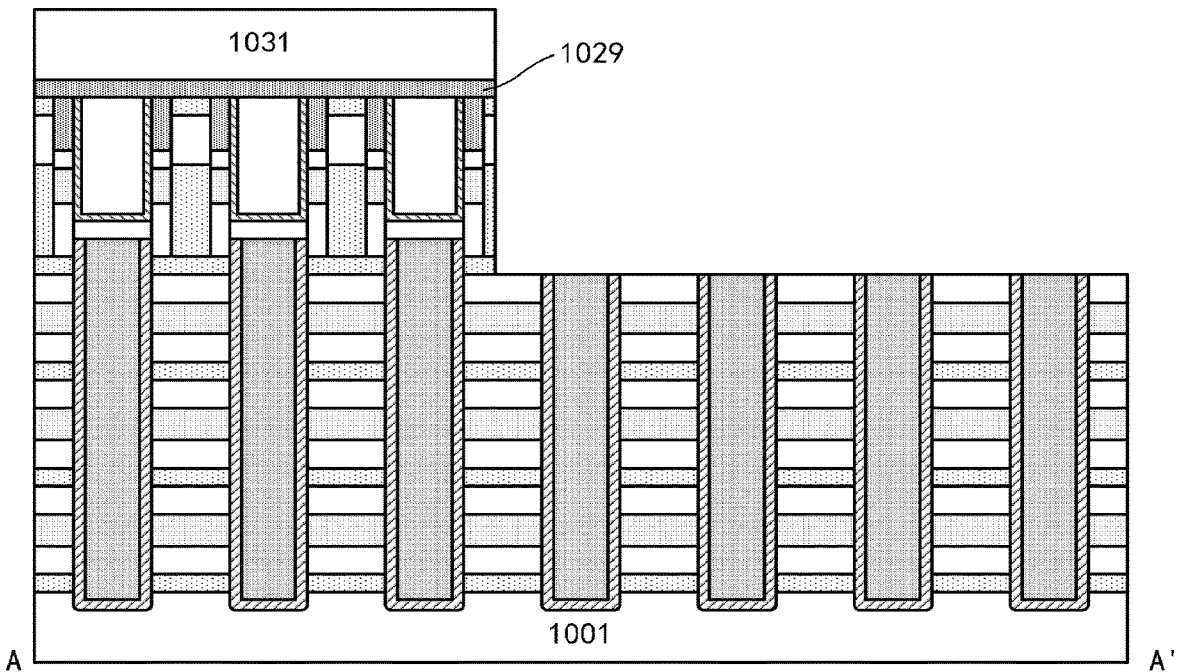

As shown in FIG. 12, the gate stack (of the selection transistor) is now exposed. In order to protect the gate stack (in the device region) when forming the stepped structure, a further hard mask layer 1029 may be formed on an isolation layer 1012', as shown in FIG. 13(a) and FIG. 13(b). For example, the hard mask layer 1029 may contain a nitride. A photoresist 1031 may be formed on the hard mask layer 1029 and patterned by photolithography to shield the device region and expose the contact region. With the photoresist 1031 as an etching mask, the hard mask layer 1029 and the spacer 1010 (both are nitrides in this example), the isolation layer 1012' and the isolation layer $1023_4$ (both are oxides in this example), the selection device layer (which is Si in this example) and the gate stack (and possible word line 1013) may be etched by selective etching such as RIE, so as to expose the memory device layer. An etching order of these layers may change according to processes. An etching depth may be controlled so that a surface exposed by the photoresist 1031 in the contact region after etching is substantially flat. Then, a step is formed between the contact region and the device region. After that, the photoresist 1031 may be removed.

Figure 14A:
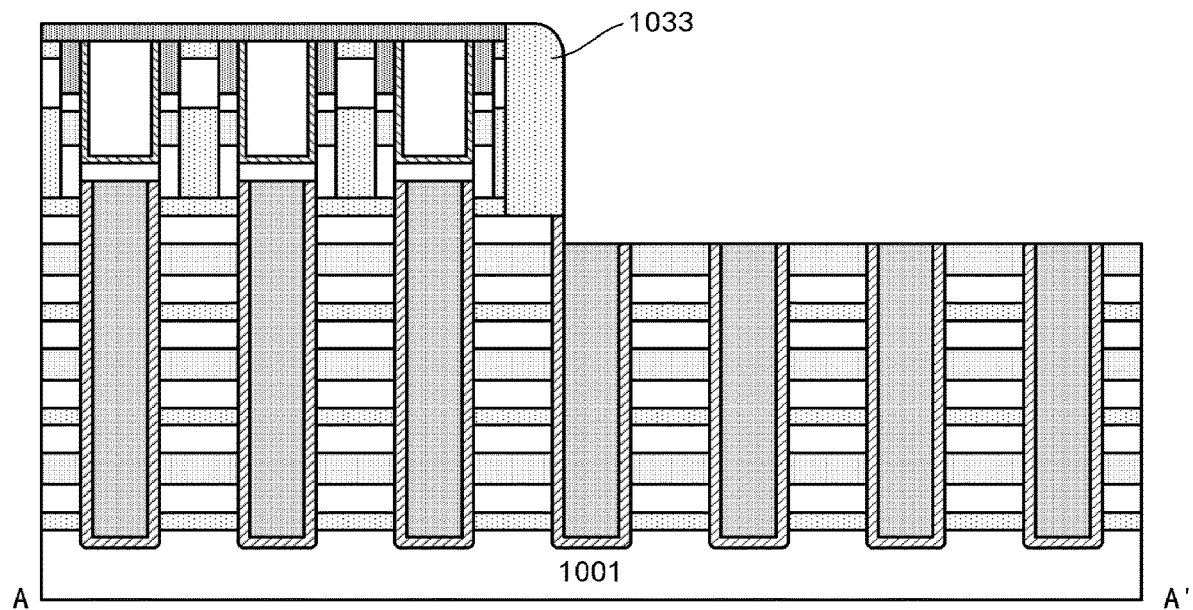
Figure 14B:
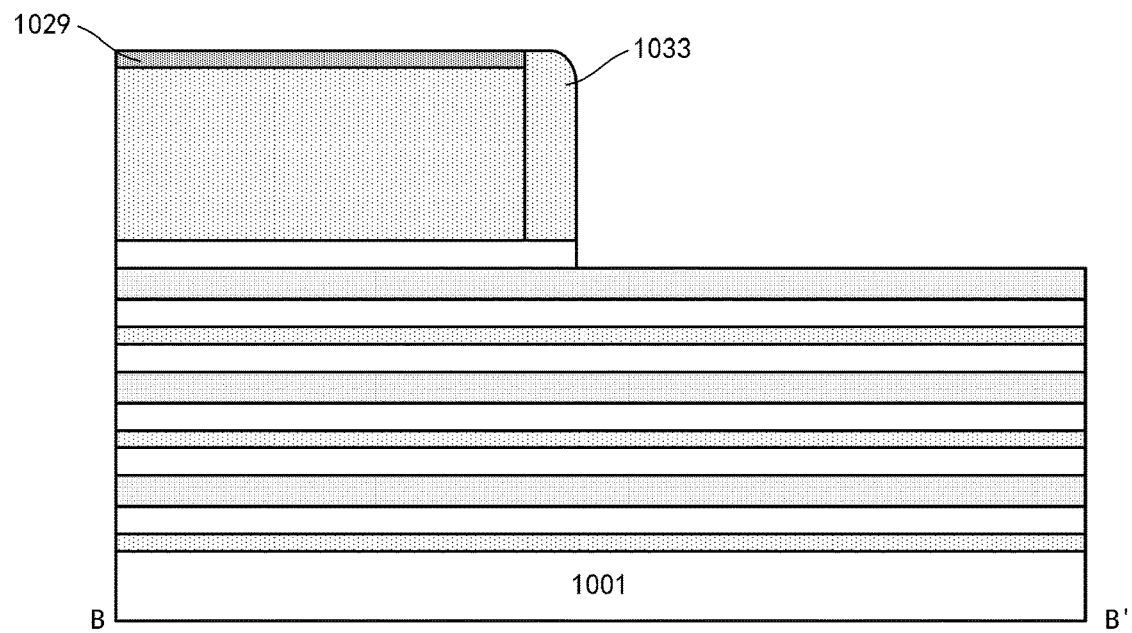

As shown in FIG. 14(a) and FIG. 14(b), a spacer 1033 may be formed at the step between the contact region and the device region by a spacer forming process. The spacer 1033 may contain, for example, an oxide. A width of the spacer 1033 (in the horizontal direction in FIG. 14(a) and FIG. 14(b)) may define a size of a landing pad of a subsequent contact portion to the source/drain region $1009_3$ in the device layer $1005_3$.

With the spacer 1033 formed in this manner as an etching mask, the exposed source/drain region $1009_3$ in the device layer $1005_3$ and the gate stack may be etched by a selective etching such as RIE, so as to expose the channel region in the device layer $1005_3$. An etching depth may be controlled so that a surface exposed by the spacer 1033 in the contact region after etching is substantially flat. For example, the source/drain region $1009_3$ and the gate conductor layer 1027 (for example, Si and polycrystalline silicon respectively) may be etched firstly (if the gate conductor layer 1027 includes a metal gate, the source/drain region $1009_3$ and the gate conductor layer 1027 may be etched separately), and the etching may stop at the channel region in the device layer $1005_3$. After such etching, a top end of the memory functional layer 1025 may protrude above the channel region in the device layer $1005_3$ and may be removed by RIE. In this way, another step is formed between the source/drain region $1009_3$ in the device layer $1005_3$ and the surface exposed by the spacer 1033 in the contact region.

Figure 15A:
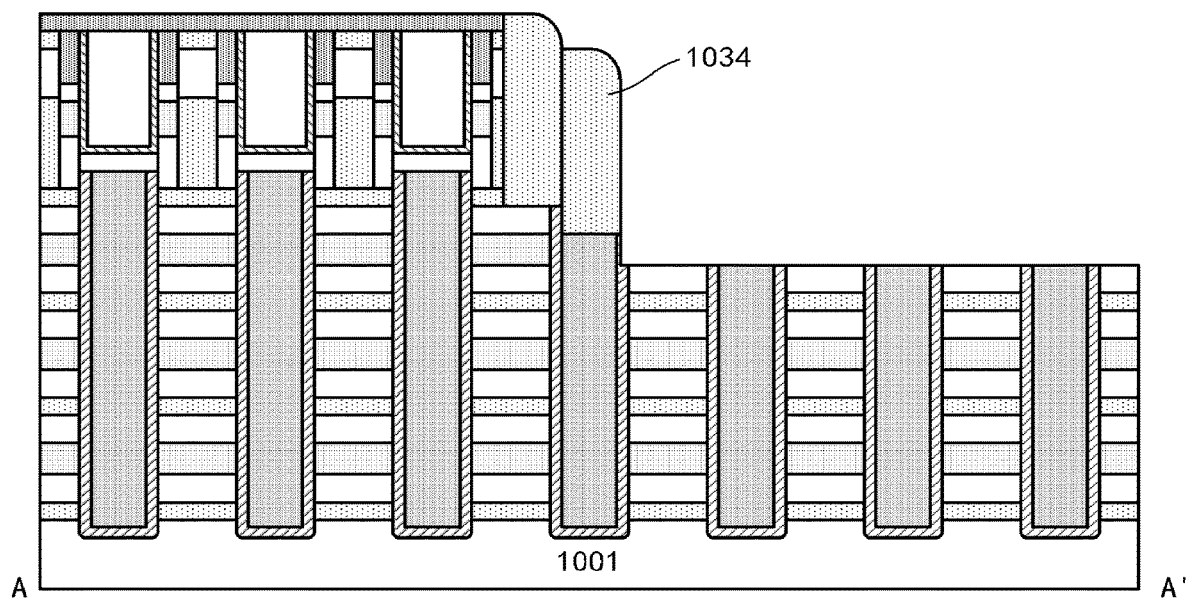
Figure 15B:
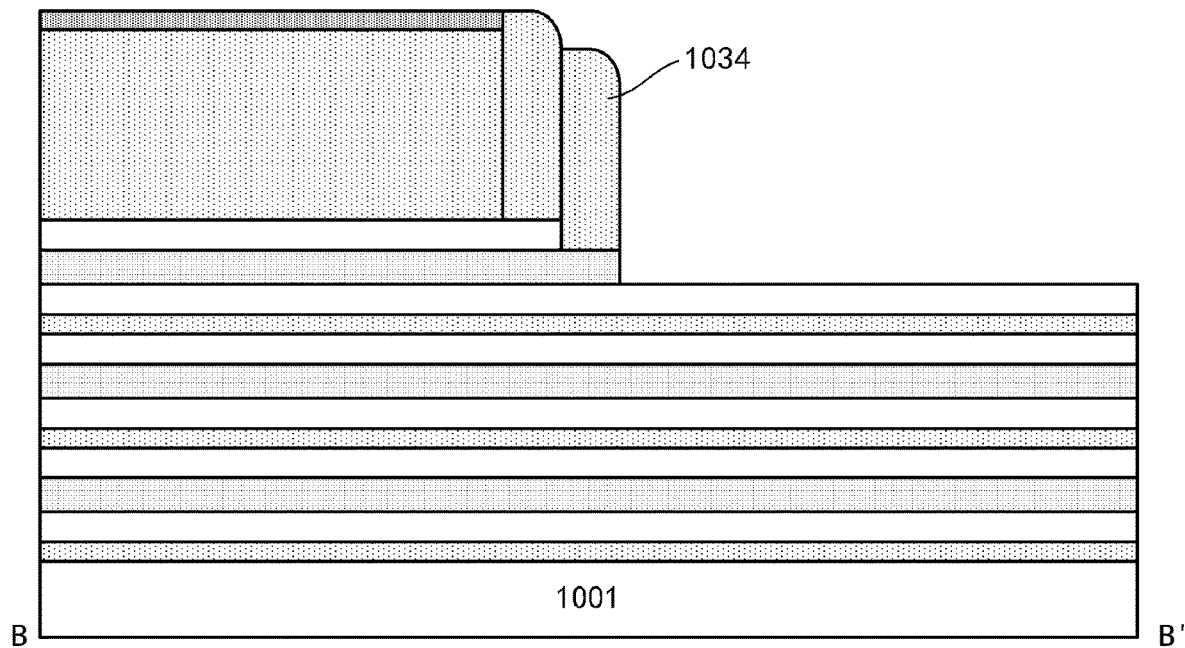

As shown in FIG. 15(a) and FIG. 15(b), a spacer 1034 may be further formed on a sidewall of the spacer 1033. A width of the spacer 1034 may define a size of a landing pad of a subsequent contact portion to the channel region in the device layer $1005_3$. With the spacer 1034 formed in this manner as an etching mask, the exposed channel region in the device layer $1005_3$ and the gate stack may be etched by a selective etching such as RIE, so as to expose the source/drain region $1007_3$ in the device layer $1005_3$. An etching depth may be controlled so that a surface exposed by the spacer 1034 in the contact region after etching is substantially flat. In this way, another step is formed between the channel region in the device layer $1005_3$ and the surface exposed by the spacer 1034 in the contact region.

Figure 16A:
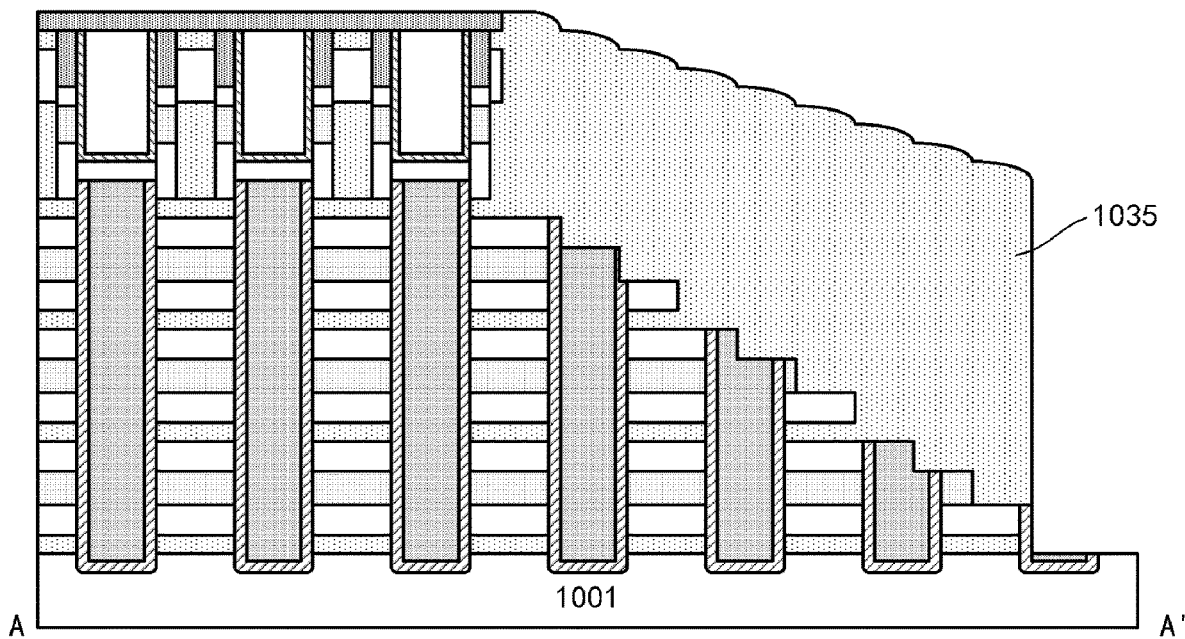
Figure 16B:
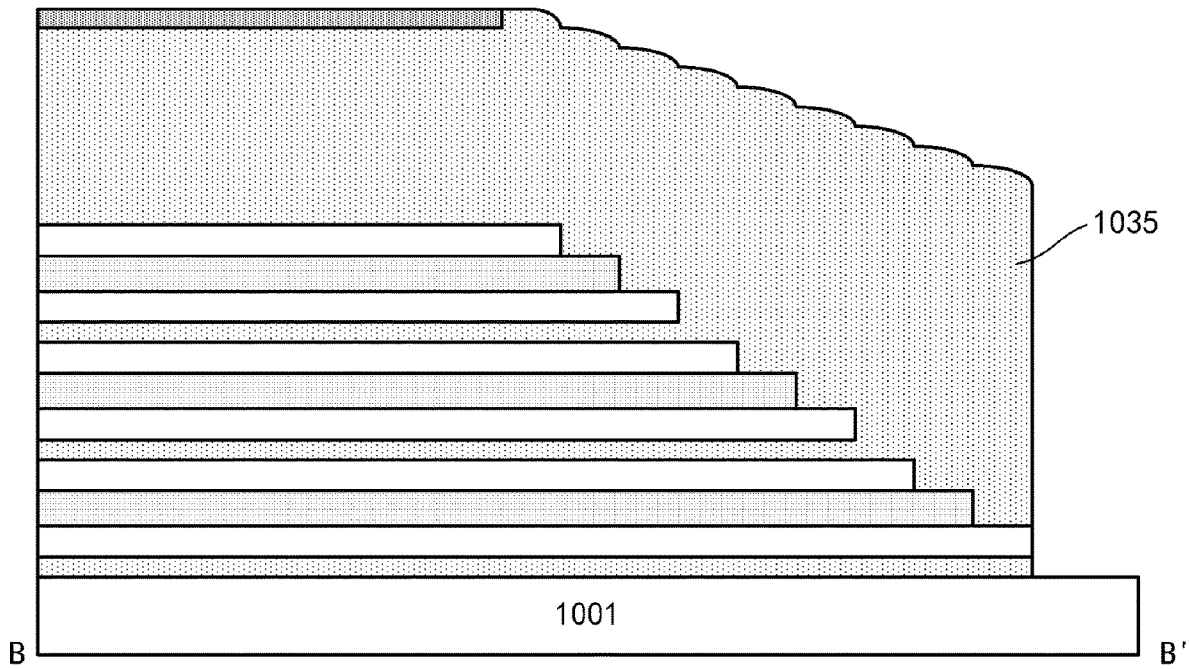

The processes described above with reference to FIG. 14(a) and FIG. 14(b) may be repeatedly performed to form a plurality of steps in the contact region by forming spacers and etching with the spacers as etching masks, as shown in FIG. 16(a) and FIG. 16(b). Such steps form such a stepped structure that in each memory device layer, each layer to be electrically connected such as the source/drain region and optionally channel region, has an end portion protruded with respect to the upper region, so as to define a landing pad of a contact portion to the region. A portion of each formed spacer being left after processing is denoted by 1035 in FIGS. 16(a) and 16(b). Since both the spacer 1035 and the isolation layer are oxide, they are shown here as integral.

After that, the contact portions may be fabricated.

Figure 17A:
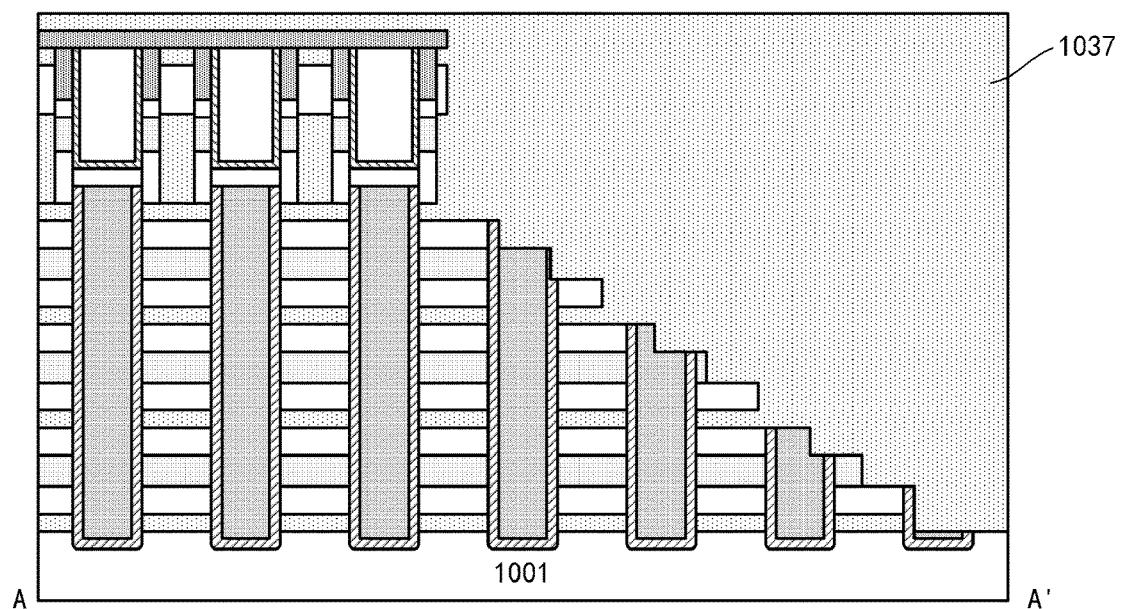
Figure 17B:
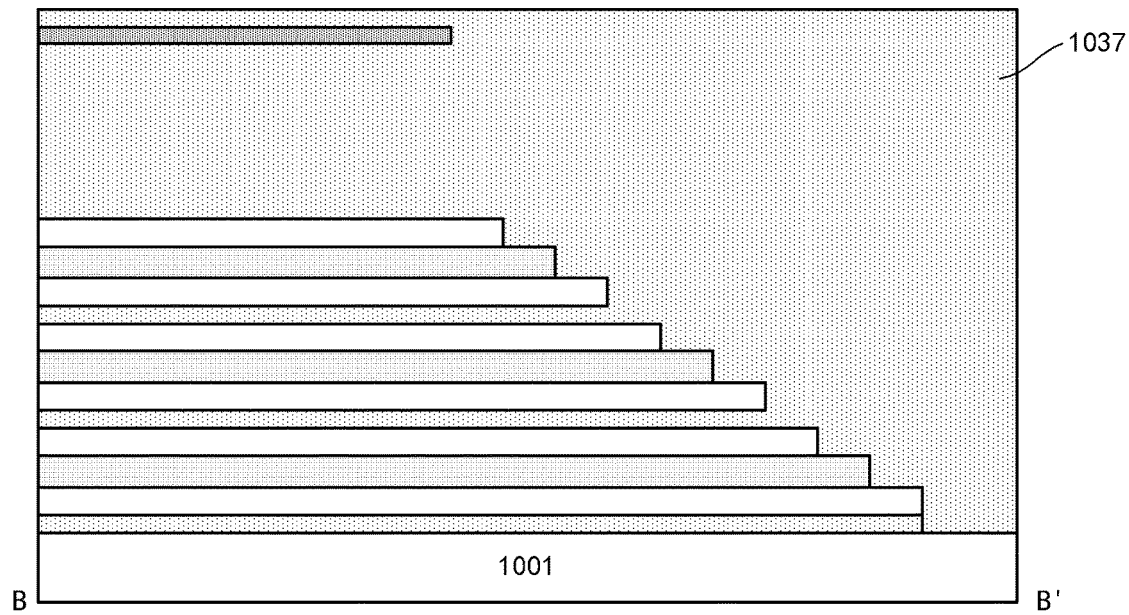
Figure 18A:
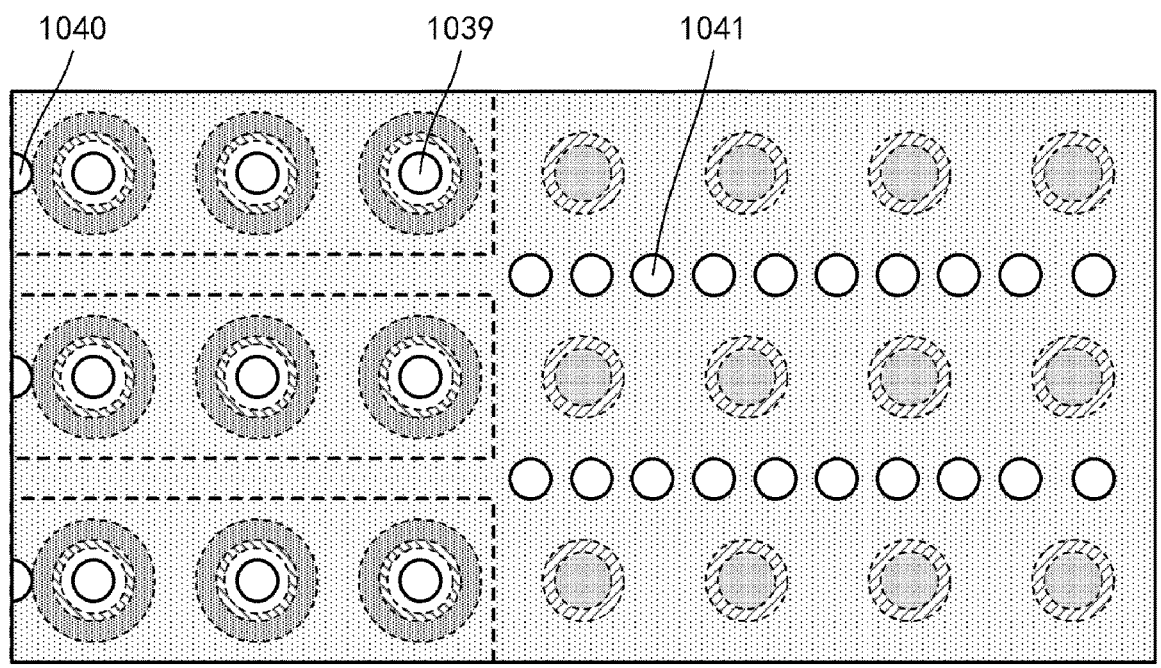
Figure 18B:
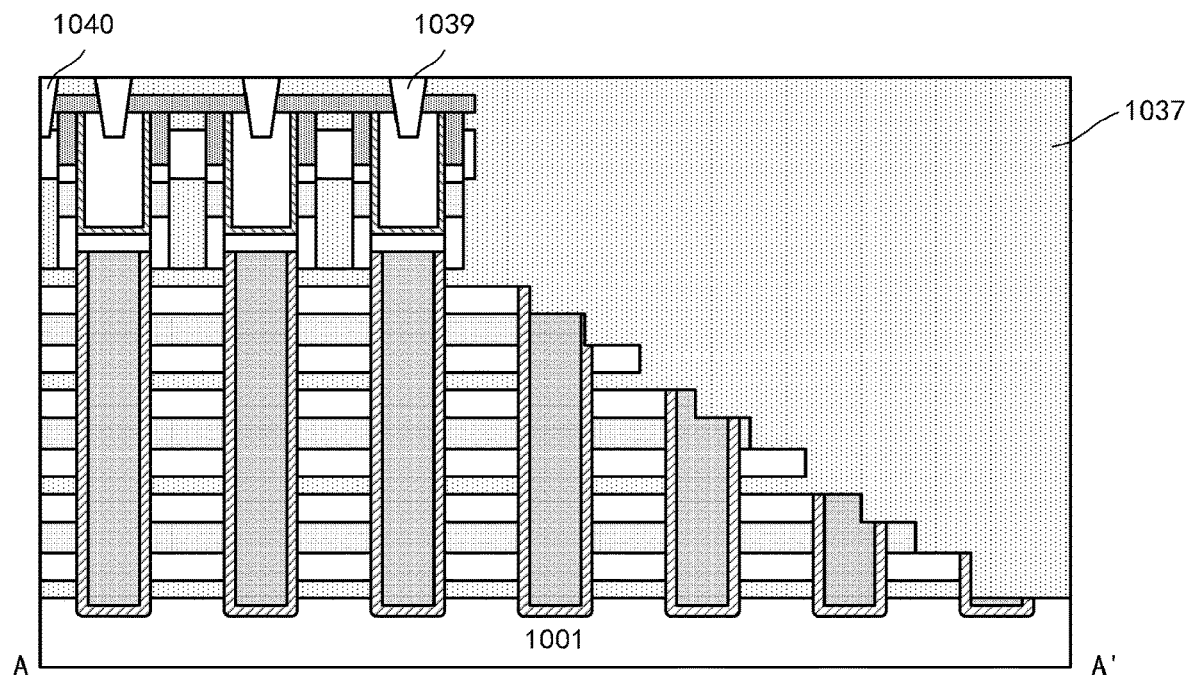
Figure 18C:
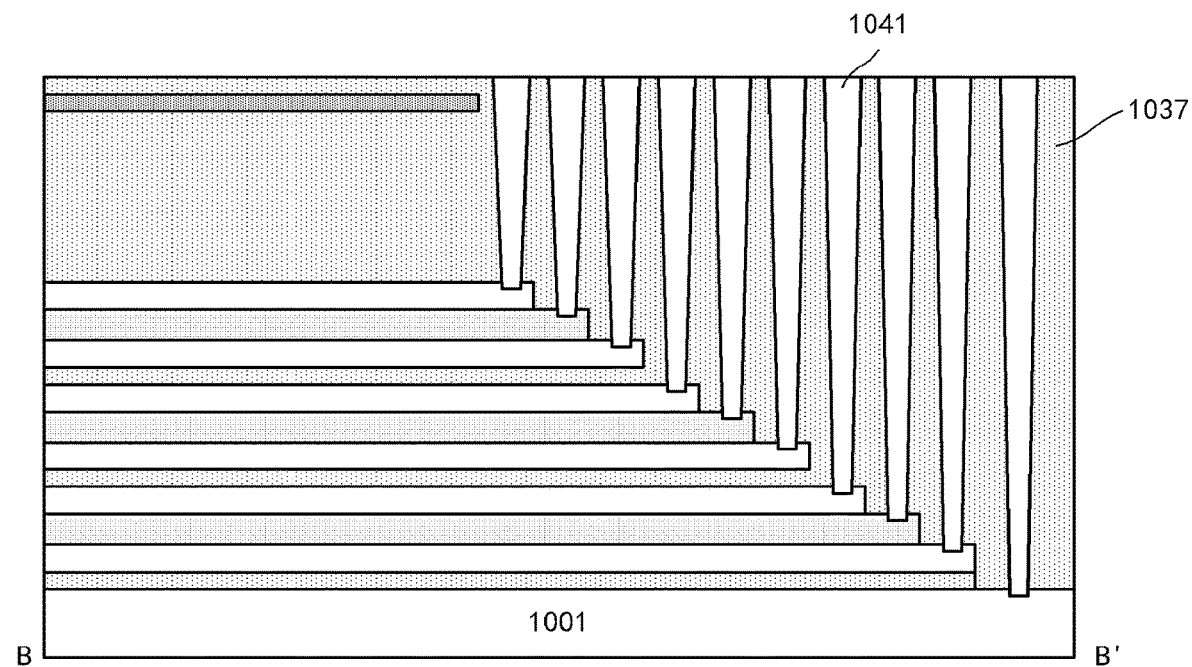

For example, as shown in FIG. 17(a) and FIG. 17(b), an interlayer dielectric layer 1037 may be formed by depositing an oxide and performing a planarization such as CMP. Here, the preceding isolation layers and the spacer 1035 are shown as being integral with the interlayer dielectric layer 1037 as they are all oxides. Then, as shown in FIG. 18(a), FIG. 18(b) and FIG. 18(c), contact portions 1039, 1040 and 1041 may be formed in the interlayer dielectric layer 1037. Specifically, the contact portion 1039 may be formed in the device region and may be electrically connected to the gate conductor layer 1018 in the gate stack of the selection transistor; the contact portion 1040 (partially shown in the figure due to a paper limitation) may be formed in the device layer and may be electrically connected to the word line 1013; the contact portion 1041 may be formed in the contact region and may be electrically connected to the source/drain region and optionally channel region of each memory cell. The contact portion 1041 in the contact region may bypass the gate stack left in the contact region. These contact portions may be formed by etching the interlayer dielectric layer 1037 to obtain holes and filling the holes with a conductive material such as a metal.

For each two adjacent memory cells in the vertical direction, the source/drain regions located in the middle, that is, the source/drain region $1009_1$ in the first memory device layer $1005_1$ and the source/drain region $1007_2$ in the second memory device layer $1005_2$ (and the source/drain region $1009_3$ in the third memory device layer $1005_3$ and a lower source/drain region (not shown) of the fourth memory device layer located above the third memory device layer $1005_3$ (if any)), may be electrically connected to the source line (which may be a common source line) via the contact portion 1041; the source/drain regions located at the upper and lower ends, that is, the source/drain region $1007_1$ in the first memory device layer $1005_1$ and the source/drain region $1009_2$ in the second memory device layer $1005_2$ (and the source/drain region $1007_3$ in the third memory device layer $1005_3$ and an upper source/drain region of the fourth memory device layer located above the third memory device layer $1005_3$), may be electrically connected to the bit lines respectively via the contact portion 1041. Then, a NOR-type configuration may be obtained. Here, a contact portion to the channel region is further formed. Such contact portion may be referred to as a bulk contact portion and may receive a bulk bias, so as to adjust the threshold voltage of the device.

Here, two memory cells adjacent in the vertical direction are configured such that the source/drain regions located near in interface between the two memory cells are electrically connected to the source line, so that a number of wires may be reduced. However, the present disclosure is not limited thereto. For example, memory cells adjacent in the vertical direction may have the same configuration, i.e. a configuration of source region-channel region-drain region, or a configuration of drain region-channel region-source region.

In such embodiments, the isolation layer containing the dopant (used as the solid phase dopant source layer) is reserved. However, the present disclosure is not limited thereto. After the diffusion doping, the solid phase dopant source layer may be replaced by other materials. For example, the solid phase dopant source layer may be replaced by other dielectric materials, particularly dielectric materials that do not intentionally contain dopants, so as to improve an isolation performance. Alternatively, each two device layers adjacent in the vertical direction are taken as a group. The solid phase dopant source layer between the device layers of each group (for example, the solid phase dopant source layer $1023_2$ between a group of the device layers $1005_1$ and $1005_2$) may be replaced by a conductive material such as a metal or a doped semiconductor layer, so as to reduce an interconnection resistance (to the source line). The solid phase dopant source layers on upper and lower sides of each group (for example, the solid phase dopant source layer $1023_1$ on a lower side of the group of device layers $1005_1$ and $1005_2$, and the solid phase dopant source layer $1023_3$ on an upper side of the group of device layers $1005_1$ and $1005_2$) may be replaced by dielectric materials, so as to achieve an isolation between the bit lines. In a case of replacing the solid phase dopant source layer, the above-mentioned "interface layer" having the sharp change in doping concentration may also be formed on a side of the source/drain region facing away from the channel region.

Figure 19A:
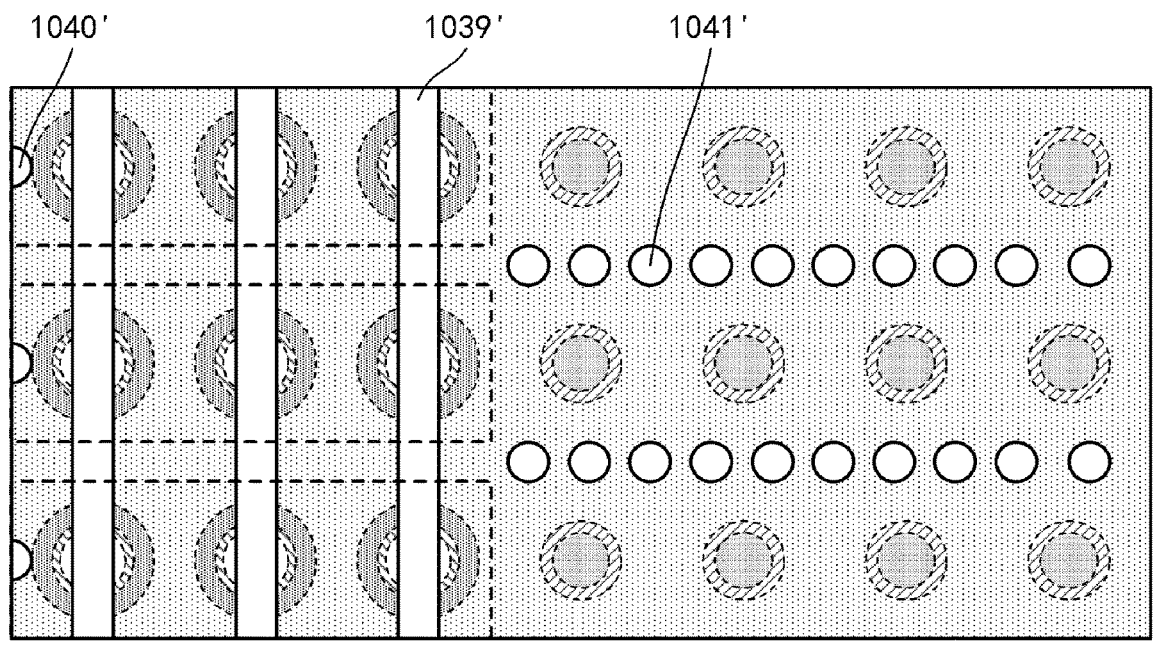
Figure 19B:
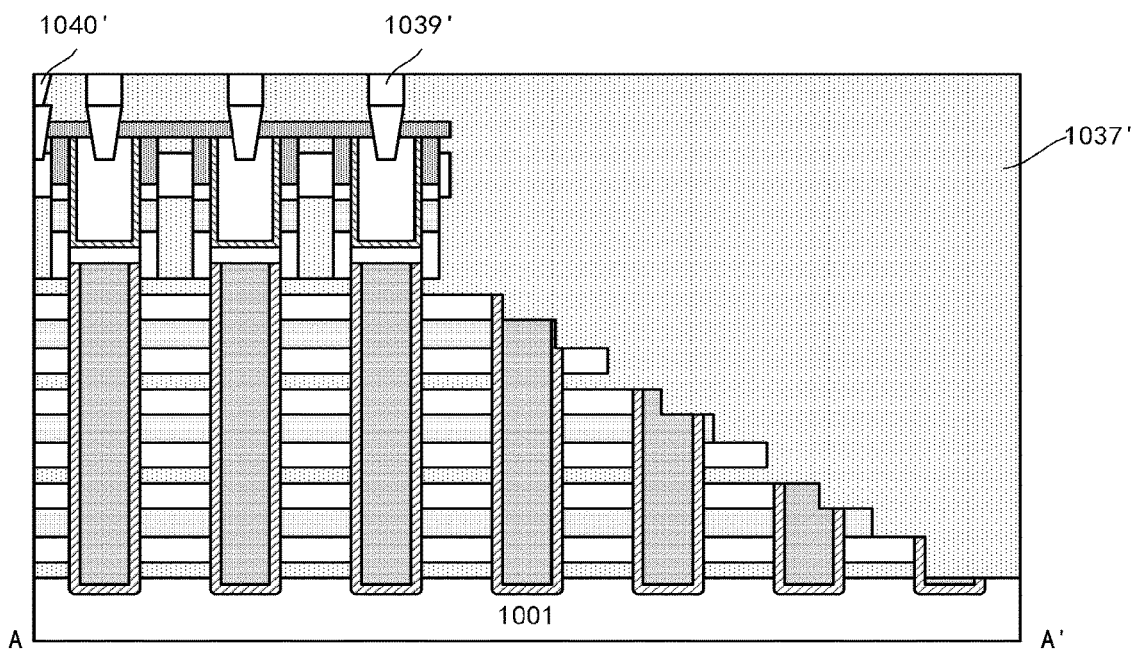
Figure 19C:
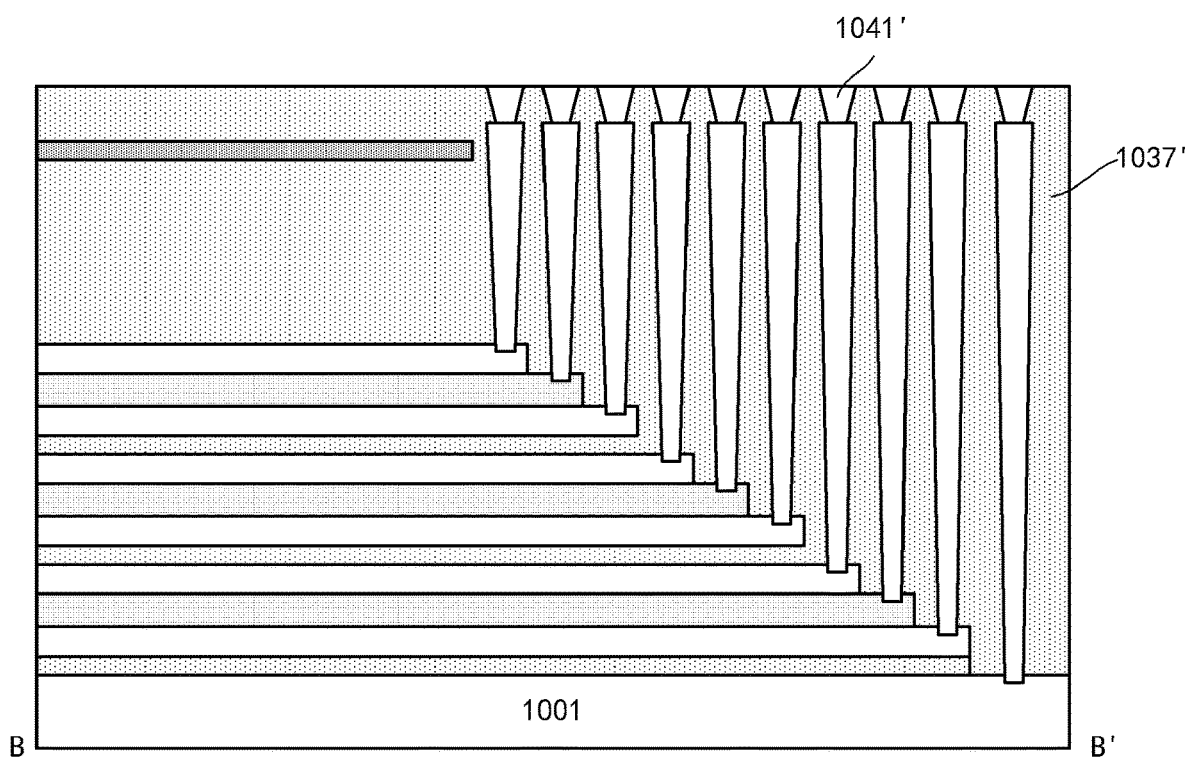

As shown in FIG. 19(a), FIG. 19(b) and FIG. 19(c), an interlayer dielectric layer (shown as 1037' integrally with the interlayer dielectric layer 1037) may be further formed on the interlayer dielectric layer 1037. A plurality of selection lines 1039' extending in the second direction and arranged in the first direction may be formed in the interlayer dielectric layer. Therefore, each word line 1013 may be electrically connected to a row of selection transistors (in the first direction), and each selection line 1039' may be electrically connected to a column of selection transistors (in the second direction). A selection of the memory cell string may be achieved through the word lines 1013 and the selection lines 1039'. Certainly, contact plugs 1040' and 1041' electrically connected to the contact portions 1040 and 1041 are further formed in the interlayer dielectric layer.

Figure 20:
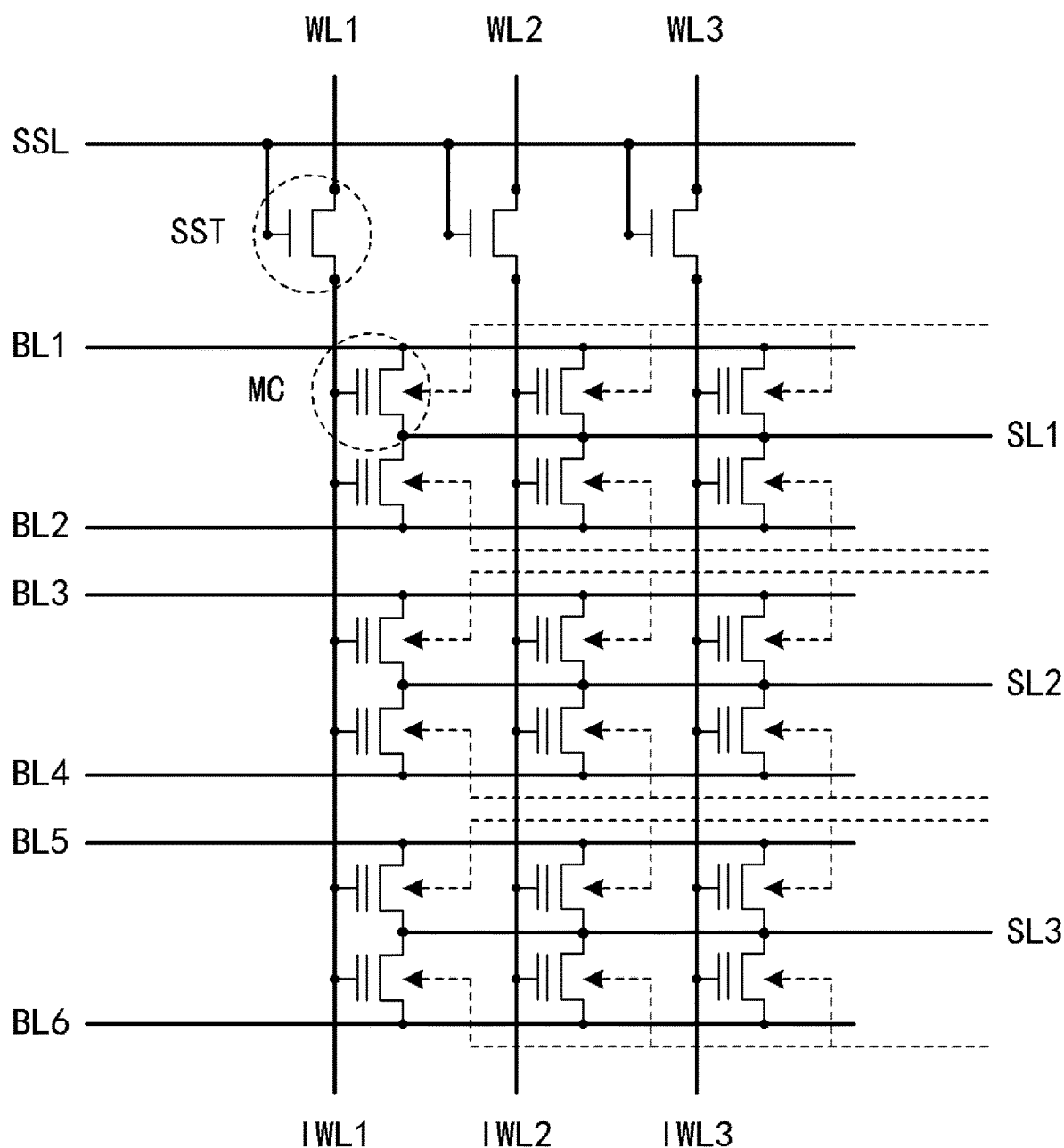

FIG. 20 schematically shows an equivalent circuit diagram of a NOR-type memory device according to the embodiments of the present disclosure.

In the example of FIG. 20, three internal word lines IWL1, IWL2 and IWL3 and six bit lines BL1, BL2, BL3, BL4, BL5 and BL6 are schematically shown. However, the specific numbers of the bit lines and the internal word lines are not limited to this. A memory cell MC is provided at an intersection of the bit line and the internal word line. FIG. 20 further shows three source lines SL1, SL2 and SL3. As described above, each two adjacent memory device layers may share the same source line connection. In addition, the source lines may be connected to each other, so that the memory cells MC may be connected to the common source line. In addition, an optional bulk connection to each memory cell is schematically shown by a dashed line in FIG. 20. As described below, the bulk connection to each memory cell may be electrically connected to the source line connection of the memory cell.

The internal word lines IWL1 to IWL3 in FIG. 20 may correspond to the gate stacks of memory cells as described above. Adjacent bit lines are isolated from each other in the vertical direction with respect to the substrate.

Each memory cell string or the internal word lines IWL1 to IWL3 may have a selection transistor SST on top and may be connected to the corresponding word lines WL1, WL2 and WL3 via the selection transistor SST. A gate electrode of the selection transistor SST may be connected to a selection line SSL.

Here, for convenience of illustration only, a two-dimensional array of memory cells MC is shown. A plurality of such two-dimensional arrays may be arranged in a direction (for example, a direction perpendicular to the paper surface in the figure) intersecting the two-dimensional array, thereby obtaining a three-dimensional array. Accordingly, a plurality of selection lines SSL may be provided in that direction.

The memory device according to the embodiments of the present disclosure may be applied to various electronic apparatuses. For example, the memory device may store various programs, applications and data required for operations of the electronic apparatus. The electronic apparatus may further include a processor in cooperation with the memory device. For example, the processor may operate the electronic apparatus by executing a program stored in the memory device. The electronic apparatus may include, for example, a smart phone, a personal computer (PC), a tablet computer, an artificial intelligence device, a wearable device, a mobile power supply, or the like.

In the above descriptions, the technical details such as patterning and etching of each layer have not been described in detail. However, those skilled in the art should understand that various technical means may be employed to form a layer, a region, etc. having a desired shape. In addition, in order to form the same structure, those skilled in the art may further design a method that is not completely the same as the method described above. In addition, although the various embodiments are described above separately, this does not mean that the measures in the various embodiments may not be advantageously used in combination.

The embodiments of the present disclosure have been described above. However, these embodiments are for illustrative purposes only, and are not intended to limit the scope of the present disclosure. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A NOR-type memory device, comprising:
    a memory device layer on a substrate, wherein the memory device layer comprises a first source/drain region and a second source/drain region located at opposite ends of the memory device layer in a vertical direction and a first channel region located between the first source/drain region and the second source/drain region in the vertical direction;
    a first gate stack that extends vertically with respect to the substrate to pass through the memory device layer, wherein the first gate stack comprises a first gate conductor layer and a memory functional layer disposed between the first gate conductor layer and the memory device layer, and a memory cell is defined at an intersection of the first gate stack and the memory device layer;

a selection device layer on the memory device layer, wherein the selection device layer comprises a third source/drain region and a fourth source/drain region located at opposite ends of the selection device layer in the vertical direction and a second channel region located between the third source/drain region and the fourth source/drain region in the vertical direction;

a second gate stack disposed above the first gate stack, wherein the second gate stack extends vertically with respect to the substrate to pass through the selection device layer; and a connecting portion electrically connecting the third source/drain region to the first gate conductor layer.

2. The NOR-type memory device according to claim 1, comprising a plurality of memory device layers stacked on the substrate, wherein the first gate stack extends through each memory device layer, and wherein the selection device layer is disposed above an uppermost memory device layer.

3. The NOR-type memory device according to claim 1, wherein the connecting portion is located between the first gate stack and the second gate stack in the vertical direction, and the first gate stack, the connecting portion and the second gate stack are self-aligned in the vertical direction.

4. The NOR-type memory device according to claim 1, wherein the second gate stack comprises a second gate conductor layer and a gate dielectric layer disposed between the second gate conductor layer and the selection device layer, and wherein the second gate stack is disposed on the connecting portion, and the gate dielectric layer further extends to a position between the second gate conductor layer and the connecting portion.

5. The NOR-type memory device according to claim 3, wherein the connecting portion comprises a conductive layer, and the conductive layer is in contact with the first gate conductor layer at a bottom surface of the conductive layer and is in contact with the third source/drain region at a side surface of the conductive layer.

6. The NOR-type memory device according to claim 2, further comprising:

an isolation layer located between adjacent layers among the selection device layer and the plurality of memory device layers.

7. The NOR-type memory device according to claim 1, wherein one of the first source/drain region or the second source/drain region in each memory device layer is electrically connected to a corresponding bit line, and the other one of the first source/drain region or the second source/drain region in each memory device layer is electrically connected to a corresponding source line.

8. The NOR-type memory device according to claim 1, comprising:

a plurality of first gate stacks, wherein in a plan view, the plurality of first gate stacks are arranged in an array in a first direction and a second direction intersecting the first direction;

a plurality of second gate stacks respectively disposed above corresponding first gate stacks among the plurality of first gate stacks, wherein the selection device layer comprises separate portions respectively surrounding the plurality of second gate stacks to define a plurality of selection transistors, and the plurality of selection transistors are arranged in an array comprising rows in the first direction and columns in the second direction;

a plurality of word lines extending in the first direction and arranged in the second direction, wherein the plurality of word lines are electrically connected to the fourth source/drain regions of corresponding rows of selection transistors respectively; and a plurality of selection lines extending in the second direction and arranged in the first direction, wherein the plurality of selection lines are electrically connected to the second gate stacks of corresponding columns of selection transistors respectively.

9. The NOR-type memory device according to claim 8, wherein each word line comprises a conductive layer surrounding a periphery of a corresponding row of selection transistors, and the conductive layer is in contact with the fourth source/drain regions of the corresponding row of selection transistors.

10. The NOR-type memory device according to claim 1, wherein the memory functional layer contains at least one of a charge trapping material or a ferroelectric material.

11. The NOR-type memory device according to claim 1, wherein each of the memory device layer and the selection device layer contains a monocrystalline semiconductor material.

12. A method of manufacturing a NOR-type memory device, comprising:

stacking at least one memory device layer on a substrate, wherein each memory device layer comprises a first source/drain region and a second source/drain region located at opposite ends of each memory device layer in a vertical direction and a first channel region located between the first source/drain region and the second source/drain region in the vertical direction;

forming a selection device layer on an uppermost memory device layer, wherein the selection device layer comprises a third source/drain region and a fourth source/drain region located at opposite ends of the selection device layer in the vertical direction and a second channel region located between the third source/drain region and the fourth source/drain region in the vertical direction;

forming a plurality of processing channels that extend vertically with respect to the substrate to pass through the selection device layer and each memory device layer, wherein in a plan view, the plurality of processing channels are arranged in an array comprising rows in a first direction and columns in a second direction intersecting the first direction;

forming a first gate stack in the processing channel, wherein the first gate stack comprises a first gate conductor layer and a memory functional layer disposed between the first gate conductor layer and the memory device layer, and a memory cell is defined at an intersection of the first gate stack and the memory device layer;

separating the selection device layer into portions respectively surrounding peripheries of corresponding processing channels in which the first gate stacks are formed;

forming a plurality of word lines extending in the first direction and arranged in the second direction, wherein each word line surrounds a portion of the selection device layer on a periphery of a corresponding row of processing channels and is in contact with the fourth source/drain region of the portion;

recessing the first gate stack to release an upper space of the processing channel, so that the third source/drain region of the selection device layer is at least partially exposed in the upper space;

forming a connecting portion on the first gate stack in the processing channel, so as to electrically connect the third source/drain region of the selection device layer to the first gate conductor layer;

forming a second gate stack on the connecting portion in the processing channel; and forming a plurality of selection lines extending in the second direction and arranged in the first direction, wherein the plurality of selection lines are electrically connected to the second gate stacks formed in corresponding columns of processing channels respectively.

13. The method according to claim 12, wherein the connecting portion is formed as a conductive layer in the processing channel, and the conductive layer is in contact with the first gate conductor layer at a bottom surface of the conductive layer and is in contact with the third source/drain region at a side surface of the conductive layer.

14. The method according to claim 12, wherein the separating the selection device layer comprises:
recessing the first gate stack;
forming a cap layer on the first gate stack in the processing channel;
forming a spacer on a sidewall of the cap layer; and
etching the selection device layer by using the spacer as an etching mask.

15. The method according to claim 12, further comprising:
forming a sacrificial layer between adjacent layers among the at least one memory device layer and the selection device layer;
replacing a plurality of sacrificial layers by solid phase dopant source layers via the processing channel; and
driving, by annealing, a dopant from the solid phase dopant source layer into opposite ends of the memory device layer, so as to form the first source/drain region and the second source/drain region.

16. The method according to claim 15, wherein the memory device layer, the selection device layer and the sacrificial layer are provided by epitaxial growth.

17. The method according to claim 15, wherein the replacing the sacrificial layer by a solid phase dopant source layer comprises:
forming a support layer in one or more of the processing channels, so that the sacrificial layer is exposed in the rest of the processing channels;
replacing the sacrificial layer by the solid phase dopant source layer via the processing channel; and
removing the support layer.

18. An electronic apparatus, comprising the NOR-type memory device according to claim 1.

19. The electronic apparatus according to claim 18, wherein the electronic apparatus comprises a smart phone, a personal computer, a tablet computer, an artificial intelligence device, a wearable device, or a mobile power supply.

* * * * *